March 9, 1954 R. C. FERGASON 2,671,298

COTTON PICKER

Filed Sept. 10, 1949 24 Sheets-Sheet 1

Inventor
Hector C. Fergason
by
Attorney

March 9, 1954 R. C. FERGASON 2,671,298

COTTON PICKER

Filed Sept. 10, 1949 24 Sheets-Sheet 2

Inventor
Rector C. Fergason
by Kenneth C. McKivett
Attorney

March 9, 1954 R. C. FERGASON 2,671,298

COTTON PICKER

Filed Sept. 10, 1949 24 Sheets-Sheet 3

Inventor
Rector C. Fergason
by Kenneth [illegible]
Attorney

March 9, 1954 R. C. FERGASON 2,671,298

COTTON PICKER

Filed Sept. 10, 1949 24 Sheets-Sheet 4

Inventor
Rector C. Fergason
by [signature]
Attorney

March 9, 1954 R. C. FERGASON 2,671,298

COTTON PICKER

Filed Sept. 10, 1949 24 Sheets-Sheet 5

Inventor
Rector C. Fergason
by Kenneth [illegible]
Attorneys

March 9, 1954 R. C. FERGASON 2,671,298

COTTON PICKER

Filed Sept. 10, 1949 24 Sheets-Sheet 6

Inventor
Rector C. Fergason
by Kenneth C. [illegible]
Attorney

Inventor
Hector C. Fergason
by Kenneth ... Attorney

March 9, 1954 R. C. FERGASON 2,671,298

COTTON PICKER

Filed Sept. 10, 1949 24 Sheets-Sheet 8

Inventor
Rector C. Fergason by Kenneth [illegible]
Attorney

March 9, 1954 R. C. FERGASON 2,671,298

COTTON PICKER

Filed Sept. 10, 1949 24 Sheets-Sheet 9

Inventor
Rector C. Fergason by Kenneth McKinney
Attorney

Inventor
Hector C. Fergason
by Kenneth McKinley
Attorney

March 9, 1954 R. C. FERGASON 2,671,298

COTTON PICKER

Filed Sept. 10, 1949 24 Sheets-Sheet 11

Inventor
Rector C. Fergason
by Kenneth C. McKissick
Attorney

March 9, 1954

R. C. FERGASON 2,671,298

COTTON PICKER

Filed Sept. 10, 1949

24 Sheets-Sheet 12

Inventor
Rector C. Fergason by Kenneth McKinney
Attorney

March 9, 1954 R. C. FERGASON 2,671,298

COTTON PICKER

Filed Sept. 10, 1949 24 Sheets-Sheet 13

Inventor
Rector C. Fergason
by Kenneth C. McKivett
Attorney

March 9, 1954 R. C. FERGASON 2,671,298

COTTON PICKER

Filed Sept. 10, 1949 24 Sheets-Sheet 14

Inventor
Rector C. Fergason by Kenneth C. McKivett
Attorney

March 9, 1954 R. C. FERGASON 2,671,298

COTTON PICKER

Filed Sept. 10, 1949 24 Sheets-Sheet 15

Inventor
Rector C. Fergason by Kenneth C. McKivett
Attorney

Inventor
Rector C. Fergason
by Kenneth C. McKinley
Attorney

COTTON PICKER

Filed Sept. 10, 1949 24 Sheets-Sheet 17

Inventor
Rector C. Fergason
by Kenneth C. McKivett
Attorney

Inventor
Rector C. Fergason by Kenneth C. McKivett
Attorney

March 9, 1954 R. C. FERGASON 2,671,298

COTTON PICKER

Filed Sept. 10, 1949 24 Sheets-Sheet 19

Inventor
Rector C. Fergason by Kenneth C. McKirdy
Attorney

Inventor
Rector C. Fergason
by Kenneth C. MacKivett
Attorney

Inventor
Rector C. Fergason
by Kenneth C. McKivett
Attorneys

March 9, 1954 R. C. FERGASON 2,671,298

COTTON PICKER

Filed Sept. 10, 1949 24 Sheets-Sheet 22

Inventor
Rector C. Fergason
by Kenneth C. McKivett
Attorney

COTTON PICKER

Filed Sept. 10, 1949 24 Sheets-Sheet 23

Inventor
Rector C. Fergason
by Kenneth C. McKinley
Attorney

March 9, 1954 R. C. FERGASON 2,671,298

COTTON PICKER

Filed Sept. 10, 1949 24 Sheets-Sheet 24

Inventor
Rector C. Fergason
by
Attorney

Patented Mar. 9, 1954 2,671,298

UNITED STATES PATENT OFFICE 2,671,298

COTTON PICKER

Rector C. Fergason, Gadsden, Ala., assignor to Allis-Chalmers Manufacturing Company, Milwaukee, Wis., a corporation of Delaware Application September 10, 1949, Serial No. 114,969

5 Claims. (Cl. 56—14)

The present invention relates generally to agricultural machines of the self-propelled type and is more particularly concerned with improving features of construction and/or combination designed to increase utility and operating efficiency of such machines.

More specifically, this invention is directed toward the provision of an improved self-propelled machine including a power driven base unit (hereinafter called a tractor) and row crop harvesting units or other types of agricultural implements mounted thereon, certain features of improvement residing in subcombinations involving the construction and coaction of base unit parts and/or of implement parts with particular reference to mechanism designed for the effective picking and handling of cotton. In addition, the present invention contemplates a design and construction for the above mentioned combinations and subcombinations such as will afford material advantages with respect to the mounting and operation of implements with respect to the balance and maneuverability of a self-propelled machine, the latter being enhanced by the practically unrestricted close range view of the crops and implements afforded an operator seated at the control station on the machine, and with respect to the ease of performing the foregoing and all other operations including maintaining the implements in a desired operating position as the tractor travels over uneven ground, causing the implements to accurately follow plant rows, and adjusting and/or repairing the tractor and implements mounted thereon.

It is therefore an object of this invention to provide a self-propelled machine incorporating features of construction and combination affording an operator seated at the control station a practically unrestricted close range view of the ground and/or of objects disposed in advance of and adjacent either side of the front end of the machine, and affording ready maneuverability and control of all parts thereof, including any implements mounted thereon.

Another object of this invention is to provide a self-propelled machine incorporating a wide rear axle structure, incorporating a narrow forwardly extending central frame structure presenting an operator's station adjacent the front end thereof and affording ample space for mounting row crop units adjacent either side thereof in advance of the rear axle structure and within the tread spacing of the rear traction wheels, and incorporating a rearwardly extending power unit suspended in cantilever balancing relation with respect to the frame structure and implements disposed in advance of the rear axle structure.

The mounting of harvesters such as cotton pickers on a tractor presents a number of problems, most of which are due to the inherent nature of a cotton picker. Cotton picking units are usually extremely heavy, particularly if they are of the spindle type, and it has been found that in mounting picking units of this type alongside the engine on tricycle type tractors that the dirigible front support becomes overloaded sufficiently to render steering difficult, and to have a tendency to become bogged down in soft fields.

Still another object of the present invention is to provide a self-propelled harvester having parts constructed and combined for coaction in an improved manner affording ample ground clearance for straddling one or more rows of full grown cotton plants, a low center of gravity, and a balanced structure, all to the end of obtaining excellent traction and ready maneuverability even on soft ground.

Another object of this invention is to provide a self-propelled harvester with a harvested material confining basket so positioned on the harvester that regardless of the percentage of capacity of harvested material confined in the basket and regardless of field conditions, the load of the basket and its contents neither disturbs the balance of the harvester nor materially affects the steering of same and wherein the load of the basket provides greater traction when the harvester is going up a grade.

Another object of this invention is to provide a three wheeled tractor having a rear mounted engine which provides two different types of power take-off mechanisms including a power take-off mechanism which operates at a speed proportional to engine speed and a power take-off which operates at a speed proportional to transmission shaft speeds.

Another object of this invention is to provide a two row harvester wherein the individual harvesters for each row are capable of independent vertical movement in relation to each other in following the ground level encountered by each.

Another object of this invention is to provide gathering points on the harvester which are simple and economical to construct and which readily follow the ground level.

Still another object of this invention is to provide a self-propelled harvester with a harvested material confining basket which can be elevated to discharge position without manually shifting the connecting means between picking units and basket and in which the connecting means is automatically repositioned upon the return of the basket to its normal material receiving position.

Another object of this invention is to provide an extension for the material conveying floor of the harvested material confining basket of a harvester which extension is readily shiftable from a material supporting unloading position to an out-of-the way position wherein the extension retains the doors of the basket in closed position.

In the prior art of cotton picking, it is well known to employ stripping bars having two oppositely located edges which strip the picked cotton from adjoining spindles. These known constructions are functionally satisfactory providing the clearance between the gripping edges and spindles is initially correct and remains substantially constant. However, as the gripping edges and spindles become worn, the clearance increases with a consequent decrease in the efficiency of the stripping action. And while attempts have been made to overcome this defect by supporting the stripping bar for adjustment vertically relative to the spindles, these attempts have failed to provide a solution since a movement of the stripping bar toward one spindle results in an increase in the clearance between the opposite edges of the bar and the other spindle.

It is therefore an object of this invention to provide improved means for stripping the picked cotton from the picking spindles, wherein the clearance between spindles and strippers can be readily adjusted, as desired, to compensate for manufacturing tolerances and/or wear; one such means, by way of illustration, comprising stripping bars which are readily adjustable so that opposite working edges thereof can be moved in opposite directions.

In the art of mechanical cotton picking, it is also well known that a moistened spindle is more efficient than a dry spindle. And it is equally well known that an excess of moisture on the spindle is to be avoided as the wet cotton will bring a reduced price as it is difficult to gin excessively wet cotton and the excess moisture causes the operating parts of the picker to deteriorate more rapidly than normal. In addition, wet cotton cannot be stored as it will mildew. Most spindle type pickers employ a plurality of spindles arranged in vertical rows, and while the problem of supplying an equal and proper quantity of water to each spindle has long been recognized, none of the known prior art machines is capable of supplying equal quantities of liquid to each spindle in a gravity feed system. And neither do these known machines provide means, controllable from the operator's station as field conditions change, for regulating exactly the quantity of liquid flowing to each spindle, the flow remaining uniform, as regulated, while the picker is operating and terminating whenever operation of the picker ceases.

Therefore, still another object of this invention is to provide a cotton picking machine with an improved means for moistening picking spindles prior to the spindles contacting unpicked cotton, wherein a like quantity of liquid is supplied to each spindle, and/or wherein the quantity of liquid being delivered to each spindle is readily and accurately varied, as desired.

Cotton pickers to operate successfully must have their picking spindles traveling at the same ground speed as the tractor supporting and driving the spindles. In the prior art tractor mounted or self-propelled pickers, it has been customary to operate the picking spindles from the power take-off shaft of the propelling power unit, the arrangement being such that shifting of the change speed transmission gearing results in the speed of the power take-off being proportionally varied. This mode of operation is satisfactory as long as the operator remembers to disengage the picker drive before shifting to a high gear. Unfortunately this is not always done and as a result the picker units are sometimes operated at a speed sufficiently in excess of that for which they are designed as to cause serious damage.

Accordingly, this invention is concerned with a tractor mounted or self-propelled agricultural unit incorporating change speed transmission gearing and implement parts driven by power derived from a power take-off means operating at a speed proportional to the transmission gearing, and has as an object the provision of means permitting operation of the power driven implement parts only when the unit is operated in one or more low speed ranges of the transmission gearing.

Cotton picking units are necessarily heavy units and to be able to raise and lower these units readily, particularly the self-raising of the units upon striking an obstruction, it is necessary that the units be counterbalanced. But mere counterbalancing springs do not solve the entire problem as a counterbalance tension spring has a maximum of energy stored therein when fully extended. Therefore, when a picker or other implement is operated in a position such that its counterbalance spring is only partially extended, other means must be provided for effectively utilizing the reduced amount of energy available to raise the picking units. And it is also an object of this invention to provide counterbalance means which are capable of furnishing a uniform amount of energy regardless of the position of the picking unit within its normal range of movement.

It has heretofore been customary to employ a pneumatic means for conveying cotton from the picking unit to the storage basket, the known means comprising a blower unit having its suction side or intake communicating with the picker unit to withdraw cotton therefrom, the cotton passing into and through the blower from which it is forcibly expelled through a suitable conduit means communicating with a storage receptacle or basket. This means of conveying the picked cotton from the picker to the basket is not entirely satisfactory as very often a destructive contact takes place between the vanes of the blower and the picked cotton resulting in a cracking of the cotton seeds and a resulting loss in grade of the cotton seed due to these cracked seeds and also hulls of the cracked seeds will not be removed by the ginning and therefore the grade of the cotton will be reduced. Moreover, some foreign material is likely to be carried along with the picked cotton and may, depending upon its nature, damage the fan in passing therethrough. In any event, the presence of foreign material and cracked hulls of the cotton seed in the picked crop, lessens its value and should be avoided.

Therefore, still another object of the present invention is to provide means for conveying cotton from the picking unit to the basket without cracking the seeds carried by the cotton. And a further and somewhat related object of this invention is to provide means for conveying picked cotton to a receiving basket incorporating an improvement operative to remove foreign material from the picked cotton.

An additional object of this invention is to provide a cotton harvester with a picking spindle which is extremely effective and which does not require continuous sharpening in order to maintain its effectiveness.

Accordingly, the present invention may be considered as comprising the various features of construction and/or combination as hereinafter more fully set forth in the following detailed description and appended claims, reference being had to the accompanying drawings, wherein:

Figure 1:
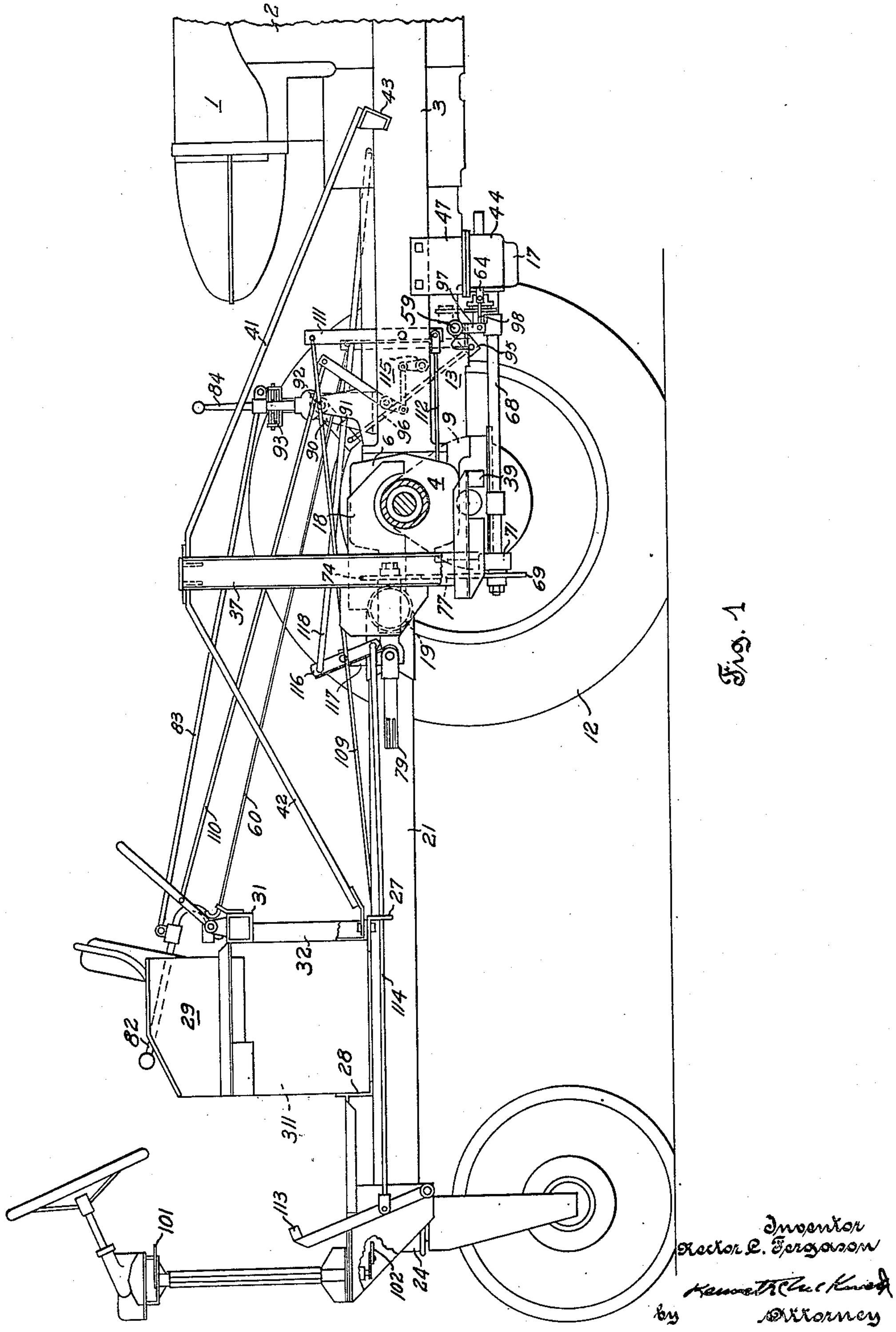
Fig. 1 is a side view of the tractor with the near rear wheel and some other parts removed for sake of clarity.
Figures 2, 3:
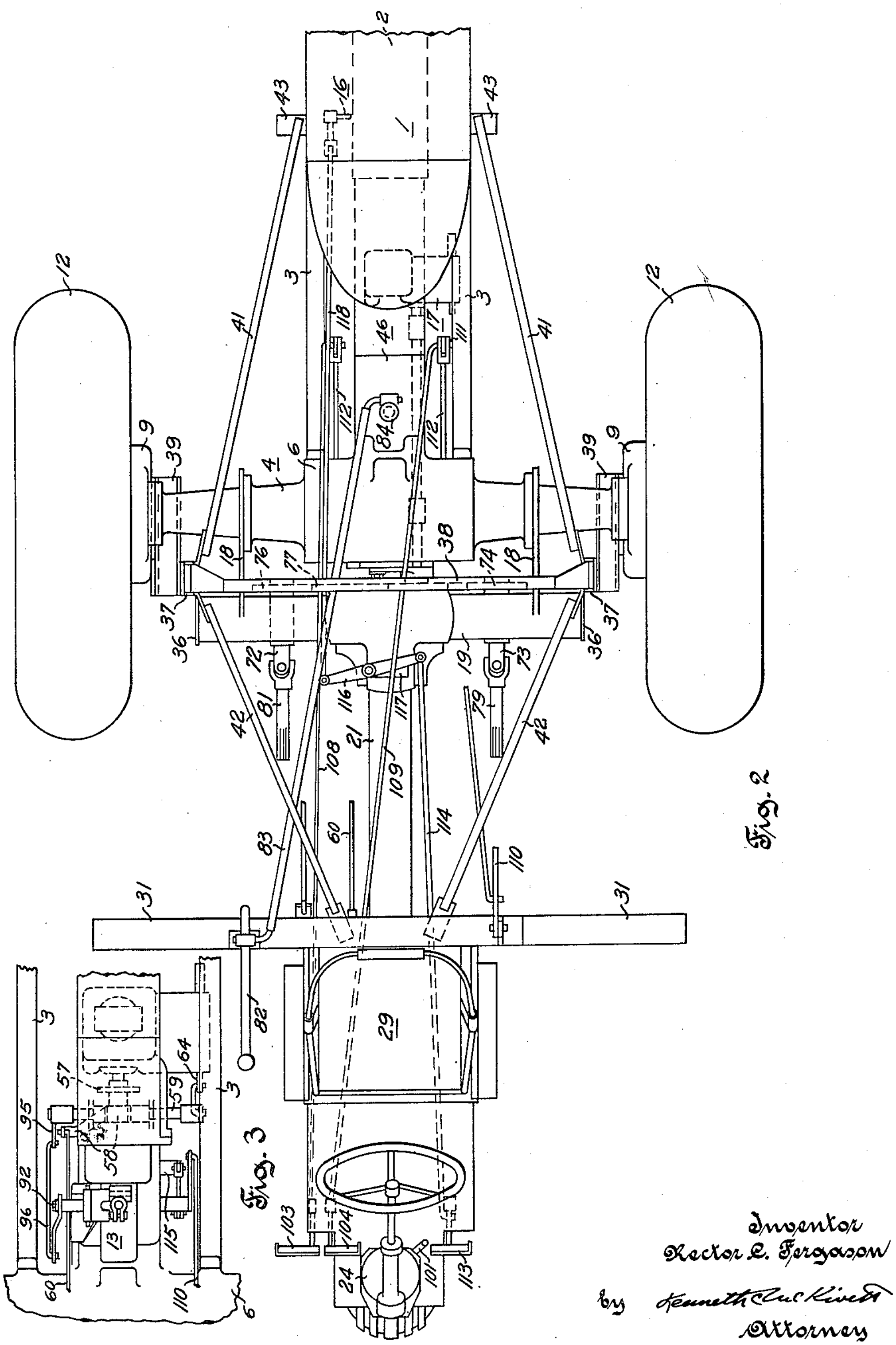
Fig. 2 is a plan view of the tractor with some of the underlying control parts removed.
Fig. 3 is an enlarged detail showing in plan some of the control parts appearing in Fig. 1.

Referring to Figs. 1, 2 and 3, tractor 1 consists generally of an engine 2 supported on frame members 3 joined at one end thereof to a transverse axle housing 4 and supported thereby as a cantilever beam. This axle housing is preferably of the drop type comprising a central or intermediate portion 6 enclosing a differential drive 7 shown diagrammatically in Fig. 7 and driven from the usual transmission shaft 8 and comprising depending side portions 9 of enclosing gearing 11 connecting the differential drive with the axles of the traction wheels 12. A change speed transmission 13 provides a variable speed connection from the engine shaft 14 through a suitable clutch 16 to the transmission shaft. A power take-off device 17 preferably associated with the engine shaft 14 serves to drive several power outlet connections which will be described in more detail later.

Figure 5:
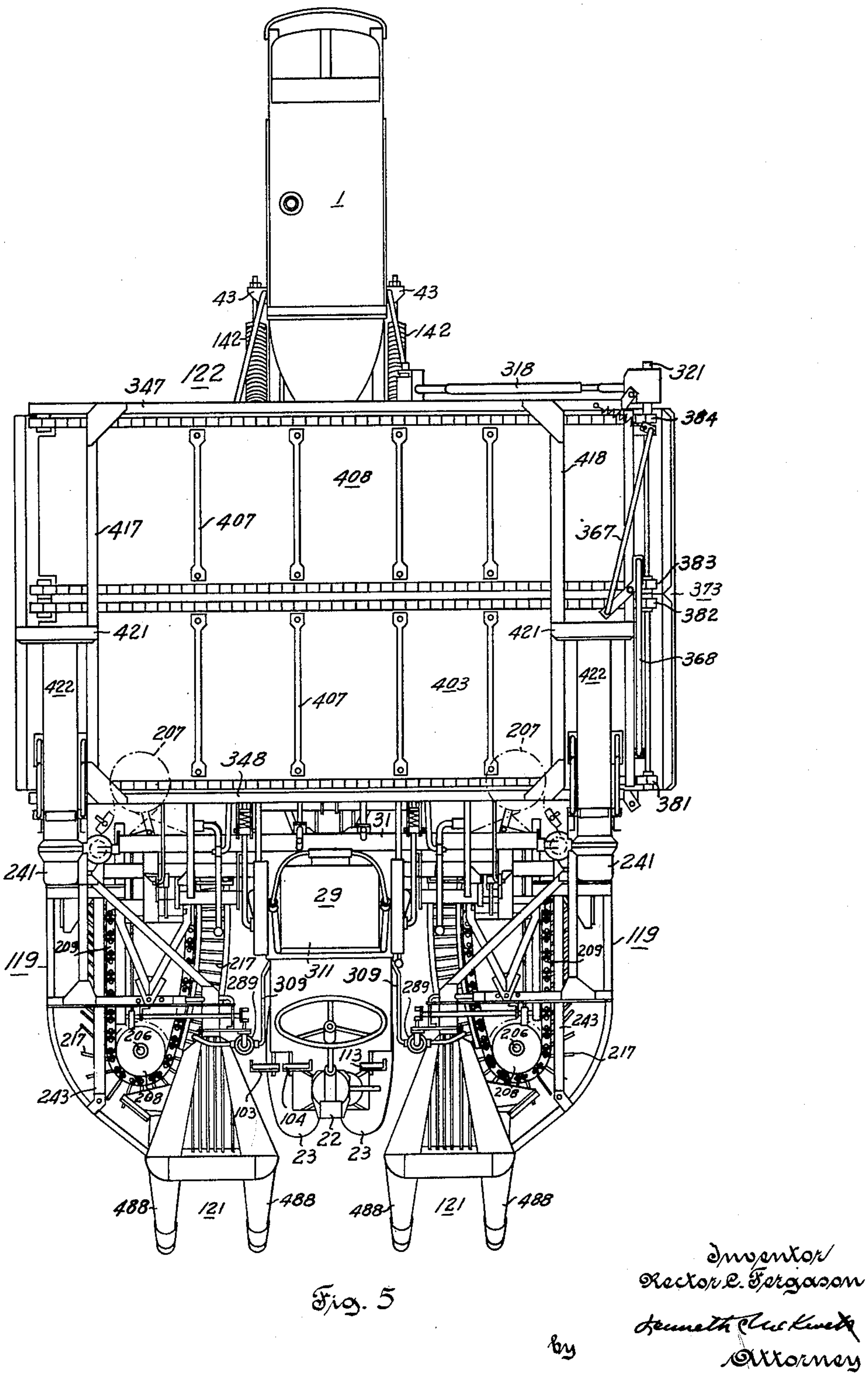
Fig. 5 is a plan view of the cotton harvester.
Figure 6:
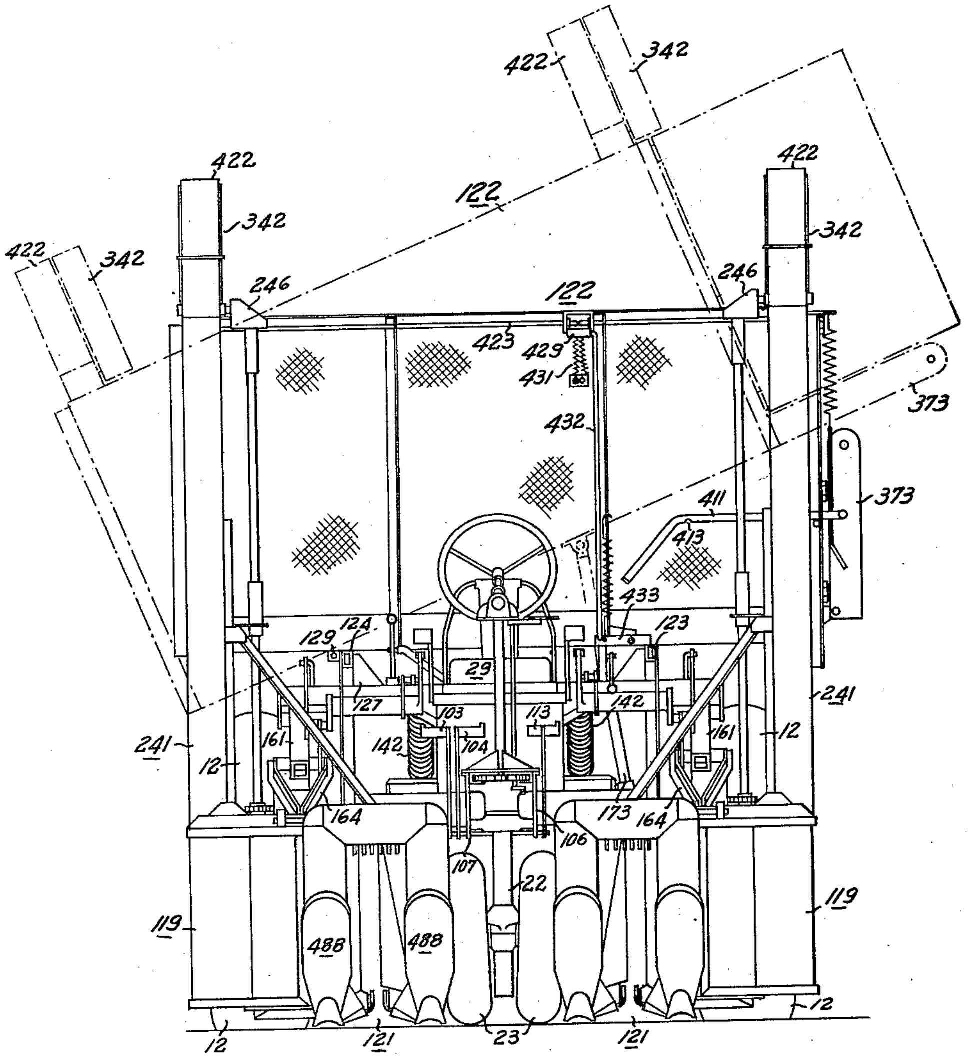
Fig. 6 is a front view of the cotton harvester.
Figures 8, 9, 10, 11:
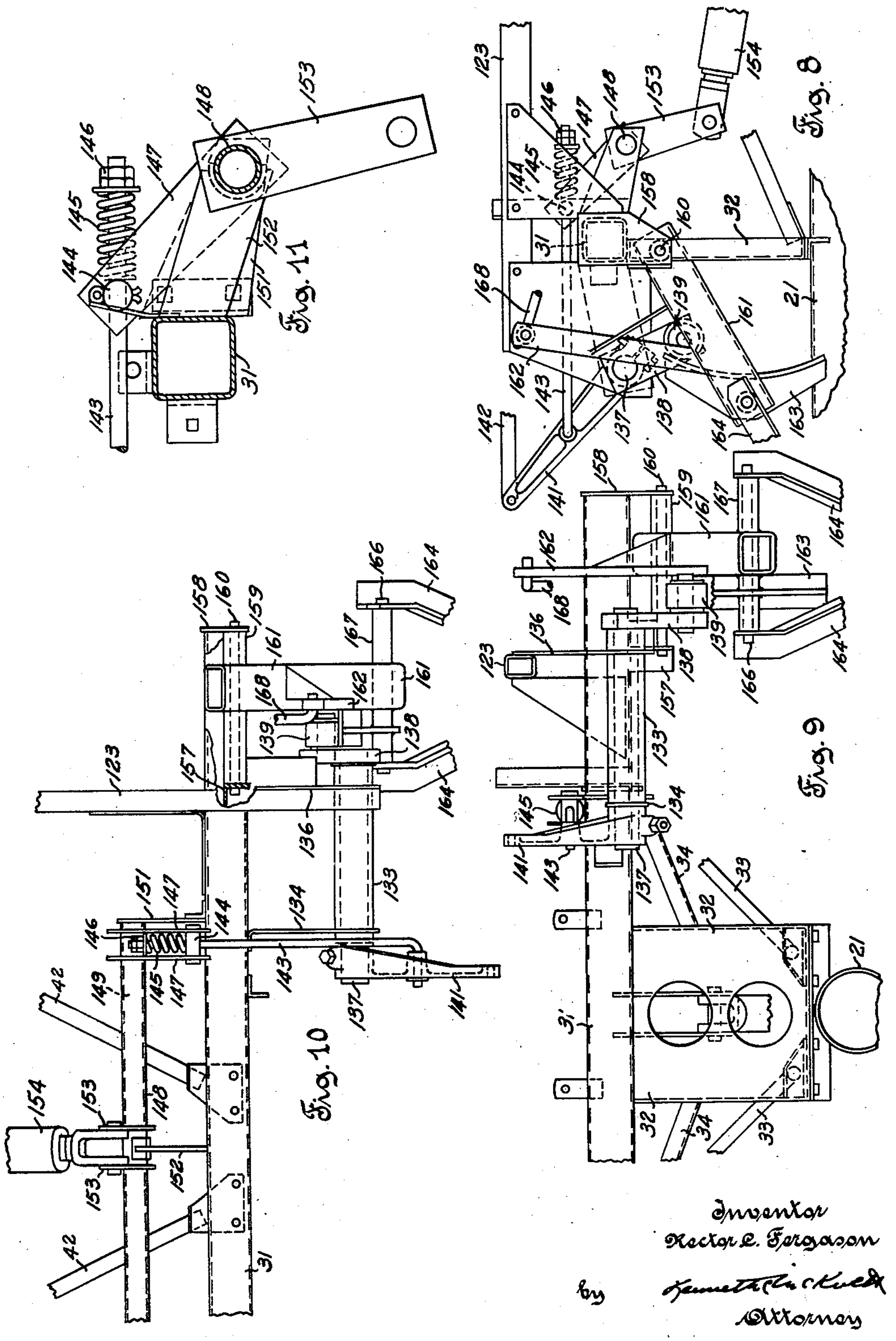
Fig. 8 is a side elevation on an enlarged scale of the lifting mechanism for a picking unit.
Fig. 9 is a front view of the lifting mechanism shown in Fig. 8.
Fig. 10 is a plan view with parts broken away and shown in section of the lifting mechanism shown in Figs. 8 and 9.
Fig. 11 is an enlarged view of that portion of the mechanism shown in Fig. 8 to which the ram is connected.

Removably connected to axle housing 4 by means of a pair of tie plates 18 is a T-shaped pipe frame having a transverse portion 19 extending generally parallel in spaced relation to axle housing 4 and a longitudinally extending central portion 21 having the forward end thereof connected to a front steerable support 22 mounting a pair of ground engaging wheels 23 as shown in Figs. 5 and 6 or if desired a steerable front support 24 may be utilized which mounts a single ground engaging wheel as is illustrated in Figs. 1 and 2. Longitudinal frame portion 21 has a pair of transversely extending angle irons 27 and 28 mounted thereon which serve as supports for an operator's seat 29. A tube member 31 is supported by frame member 21 in transversely extending spaced elevated relation thereto by means of a channel plate member 32 carried by angle iron 27 and is adapted to serve as a support frame member for implements or other equipment it might be found desirable to mount thereon. Tube 31 is additionally supported by braces 33 and 34 having their lower ends carried by channel plate 32 as is shown in Fig. 9.

Connected to the ends of transverse frame member 19, as by welding, are vertically extending plate members 36 which are supportingly connected to vertically extending channel members 37. The upper ends of channel members 37 are joined by a cross member 38. An additional bracing connection between axle housing 4 and pipe frame member 19 is provided by braces 39 which are connected as by bolting to the lower ends of channel members 37 and to axle housing depending side portions 9. Additional braces 41 and 42 extend from the upper end of channel members 37 to flanges 43 carried by tractor frame members 3 and to channel plate 32, respectively.

Figure 7:
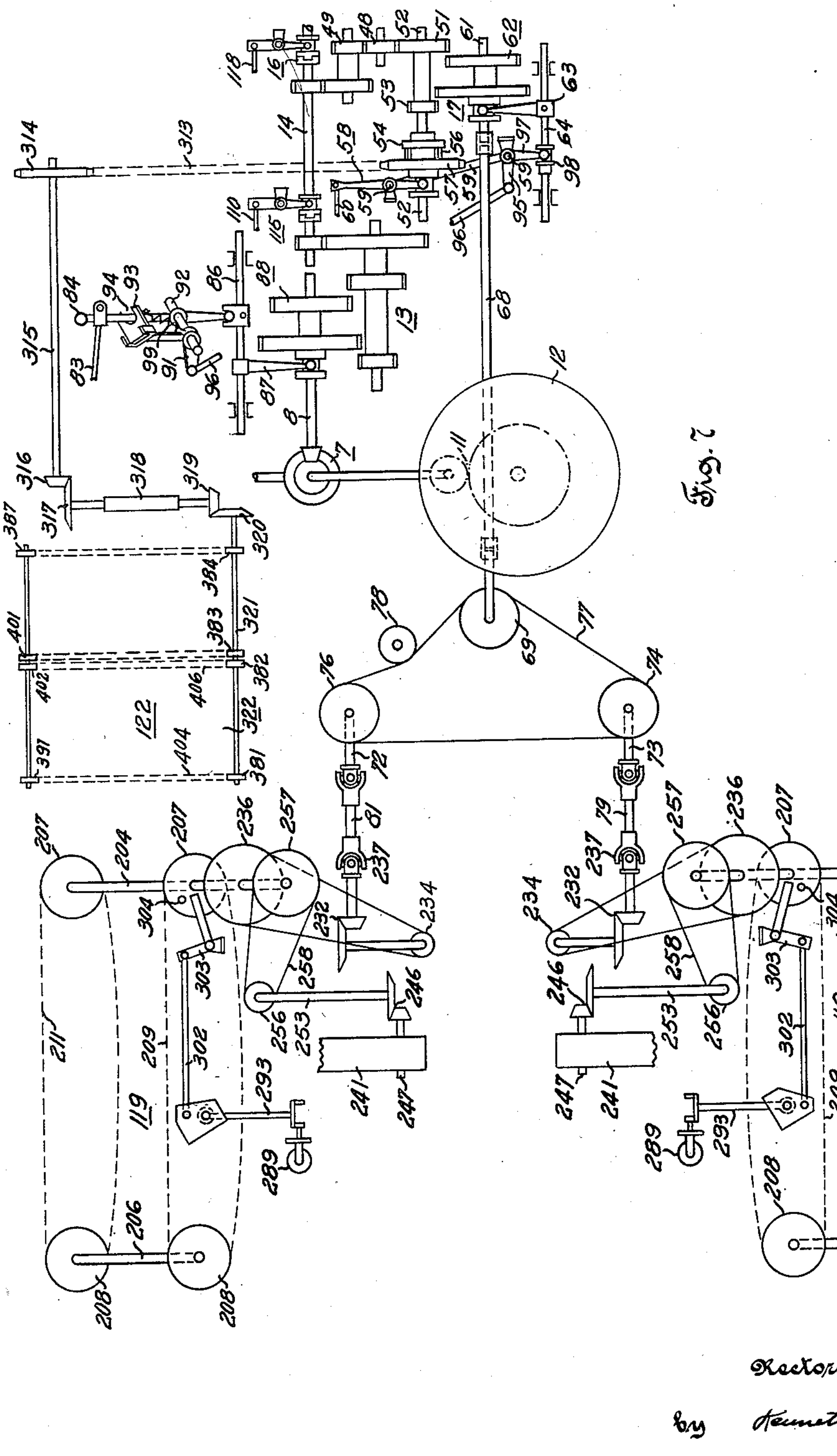
Fig. 7 shows in diagrammatic form the various driven elements of the cotton harvester.
Figure 12:
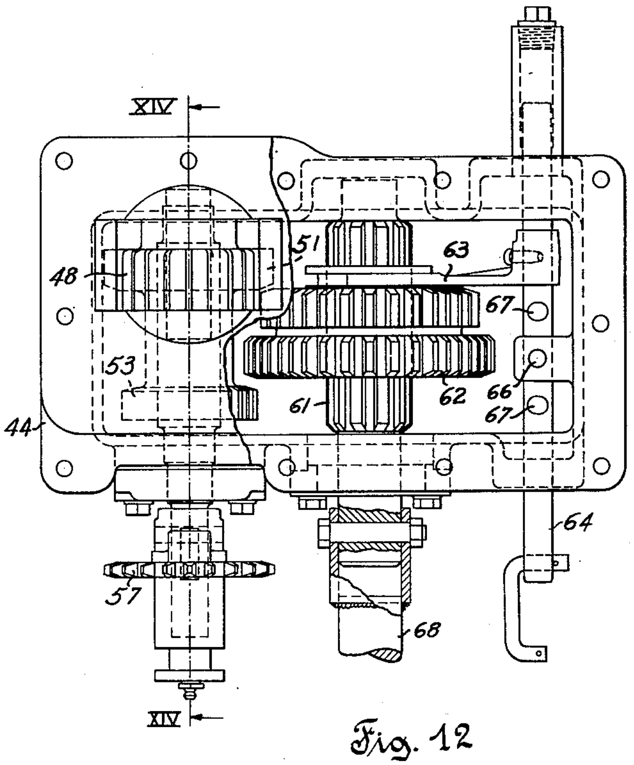
Fig. 12 is a plan view of the power take-off with a portion of the cover broken away.
Figure 14:
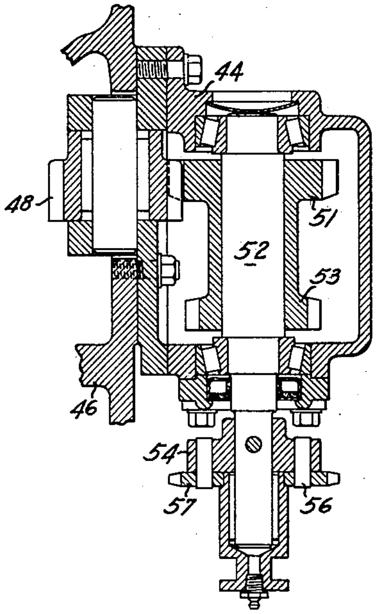
Fig. 14 is a section taken on the line XIV—XIV of Fig. 12.
Figure 13:
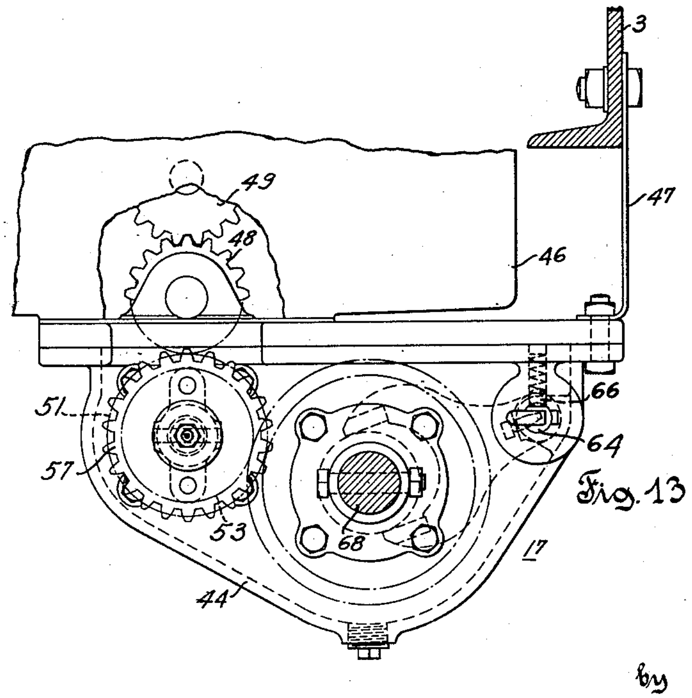
Fig. 13 is an end view of the power take-off shown in Fig. 12.

A power take-off housing 44, such as is shown in Figs. 12, 13 and 14, is bolted to the transmission housing 46 of the engine and to tractor frame member 3 through a tie plate 47, and the power take-off housing is positioned between the clutch 16 and the transmission change speed gearing 13 (see Fig. 7) whereby an idler gear 48 rotatably supported by the power take-off housing 44 is meshed with gear train 49 connected to engine shaft 14 to be driven thereby as is shown in Figs. 7 and 13. Idler gear 48 is also meshed with gear 51 on shaft 52 which is rotatably supported in housing 44, which shaft has also attached thereto a gear 53 and a clutch element 54, the latter engaging a clutch element 56 carried by a sprocket wheel 57 rotatably supported on shaft 52 and adapted to drive any desired mechanism.

Figures 15, 16, 17, 18, 19:
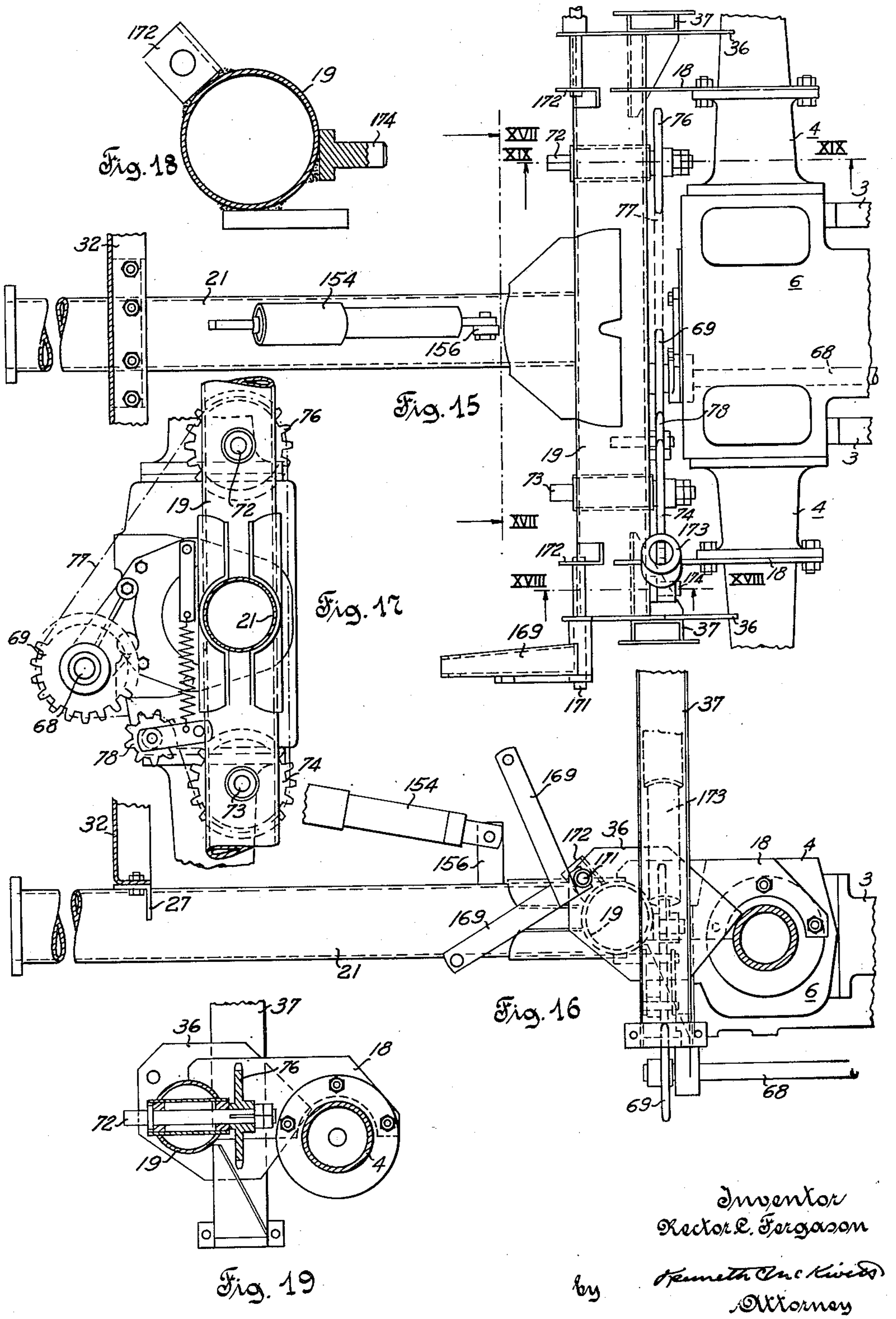
Fig. 15 is an enlarged fragmentary plan view of main frame and drive mechanism carried by the rear axle housing.
Fig. 16 is a side view of the structure shown in Fig. 15.
Fig. 17 is a section taken on the line XVII—XVII of Fig. 15.
Fig. 18 is an enlarged sectional view taken on the line XVIII—XVIII of Fig. 15.
Fig. 19 is a section taken on the line XIX—XIX of Fig. 15.

A bell crank 58 (see Figs. 1, 3 and 7) pivotally mounted on a stub shaft 59 rotatably journaled in depending portions of transmission housing 46 has one bifurcated arm which is adapted to be received within a reduced portion of the hub of sprocket wheel 57 which is movable into driven relation to shaft 52 by pivoting bell crank 58 about shaft 59 thereby causing clutch element 56 to engage with clutch element 54. Pivotally connected to the other arm of bell crank 58 is an operating rod 60 which is slidably supported on a bracket carried by tube 31 with the operating handle of the rod positioned adjacent the operator's station 29. Sprocket wheel 57 provides a power take-off outlet which is readily controlled from the operator's station and which power take-off will operate at a speed directly proportional to the engine speed and in one direction only regardless if the tractor is moving forwardly, rearwardly or remaining stationary. Rotatably mounted in housing 44 (see Fig. 12) is a spline shaft 61 having a double gear 62 slidably mounted thereon with the aforesaid double gear being shiftable to mesh in driven relation with gear 51, with gear 53 or to remain in a neutral position. Shifting yoke 63 encircles a reduced portion of double gear 62 and is attached to shift rod 64 slidably received in housing 44 and having a spring biased detent 66 cooperable with indentations 67 in rod 64 to normally restrain this rod from being slid when the detent is in engagement with one of the aforesaid indentations. Attached to one end of spline shaft 61 for rotation therewith is a shaft 68 having a sprocket 69 (see Figs. 1 and 7) attached at the other end thereof. An end portion of shaft 68 is journaled in a bracket 71 attached to the lower portion of housing 6. Journaled in transverse pipe frame 19 are stub shafts 72 and 73 presenting rear end portions mounting sprocket wheels 74 and 76, respectively, for rotation therewith, these sprocket wheels being driven by sprocket wheel 69 and a chain 77 which is suitably tightened by spring biased idler sprocket 78 pivotally carried by transverse tube 19 (see Fig. 17). The other ends of stub shafts 72 and 73 are provided with universal connections 79 and 81, respectively, which can be connected to any desired mechanism.

As can be seen from Figs. 1 and 2 all the controls for operating the tractor are positioned adjacent the operator's seat 29 for easy manipulation of same. A gear shift lever 82, pivotally mounted on tube 31, is connected by means of link 83 to a transmission gear shift lever 84 which is pivotally carried by transmission housing 46 and is pivotally connected to a rod 86 (see Fig. 7) slidably received in the transmission housing. Rod 86 has a yoke member 87 attached thereto and operatively connected to transmission shift gears 88 for shifting same relative to transmission gear train 13 drivenly connected to engine shaft 14.

A bell crank 91 is pivotally mounted on a stub shaft 92 carried by a bracket 90 attached to the transmission housing (see Fig. 1) and presents a bifurcated arm pivotally supporting a plate member 93 having a recess 94 in one side thereof which is adapted to partially encircle gear shift lever 84. The other arm of bell crank 91 is pivotally connected to a crank arm 95 by means of link 96. Crank arm 95 is attached to stub shaft 59 which also carries a crank arm 97 which is pivotally connected to slide member 64, this member carrying yoke 63, by means of a link coupling 98. Plate member 93 is biased by an over center spring 99 (see Fig. 7) carried by bell crank 91, this spring acting to maintain plate 93 in a position adjacent shift rod 84 wherein the latter is disposed in recess 94 when the tractor is shifted to first or second gear or in a position with plate 93 pivoted back away from the gear shift lever wherein the shift lever 84 will not engage with the plate 93 when the tractor transmission gears are shifted. Plate 93 can be moved to the latter position during transport or at any time it is desired to use the tractor but not to use this power outlet. With plate member 93 positioned as indicated in Fig. 7, then as the tractor transmission gears 88 are shifted from neutral to first or second gear, the power take-off gears are likewise shifted to first or second gear, respectively. However, if the tractor is shifted to any gear other than first or second gear, the gear shift lever moves out of recess 94 and the power take-off gears 62 remain in a neutral position. This prevents the operation of any power take-off operated mechanisms at third, fourth or reverse speeds as many such mechanisms are designed for low speed operation which speed must be coordinated with ground speed. In other words, the power take-off is so constructed and coordinated in relation to the transmission gears that the aforesaid power take-off is always operating at a speed directly proportional to the transmission gear speed and this proportion remains the same regardless if the transmission gears are operated in first or second speed.

Hand lever 101 is operatively connected to a conventional throttle control means on the carburetor (not shown) of engine 2 by means of suitable linkage including link 102. Individual foot brake pedals 103 and 104 are pivotally mounted on plates 106 and 107 carried by the forward end portion of longitudinally extending frame member 21 and are operatively connected to individual brakes controlling rotation of the traction wheels 12 by means of links 108 and 109 which are pivotally attached to the upper ends of a pair of levers 111 pivotally supported by frame members 3 (Fig. 2). The lower ends of levers 111 are pivotally connected to rods 112 which in turn are connected to conventional differential brakes enclosed within housing 6 and not shown. Clutch 16 is controlled by foot pedal 113 which is pivotally mounted on plates 106 and 107 carried by the front end of frame member 21 and is connected by link 114 to a bar 116 pivotally mounted at a mid-point thereof to flange 117 on frame member 21. The other end of cross rod 116 is pivotally connected to a rod 118 operatively attached to clutch 16 (Fig. 7). An additional clutch 115, may be provided between the power take-off device 17 and the change speed gearing 13 so as to operate power driven implement parts while the tractor is standing still. This is desirable in that the tractor may be stopped and the implements cleared of accumulated material by operating same, and in that it permits the implements to attain a proper operating speed before the tractor moves forward thereby avoiding a sudden overload on the tractor engine and parts driven thereby. Clutch control element 115 is operable by conventional linkage 110 carried by tube member 31 in position adjacent the operator's station 29 (Fig. 1).

From the foregoing it is seen that the embodiment of applicant's invention thus far described comprises a new type of tractor which provides means for readily mounting implements thereon, such as harvesting machinery, in adjacent relation to the operator's station whereby the operator will be able to follow readily the operation of the mounted equipment in relation to the crop being worked upon, which provides means for operating mounted equipment from a power take-off of the tractor at speeds either proportional to ground speed or proportional to engine speed, as desired, and which provides a readily accessible engine despite the presence of mounted equipment.

In addition, since the cantilever mounted engine acts to counterbalance the weight of any harvesting or other implement carried by frame member 21, the tractor has excellent traction and is readily steerable due to the fact that a large percentage of the total weight of the tractor and implement is carried by the rear axle structure.

Figure 4:
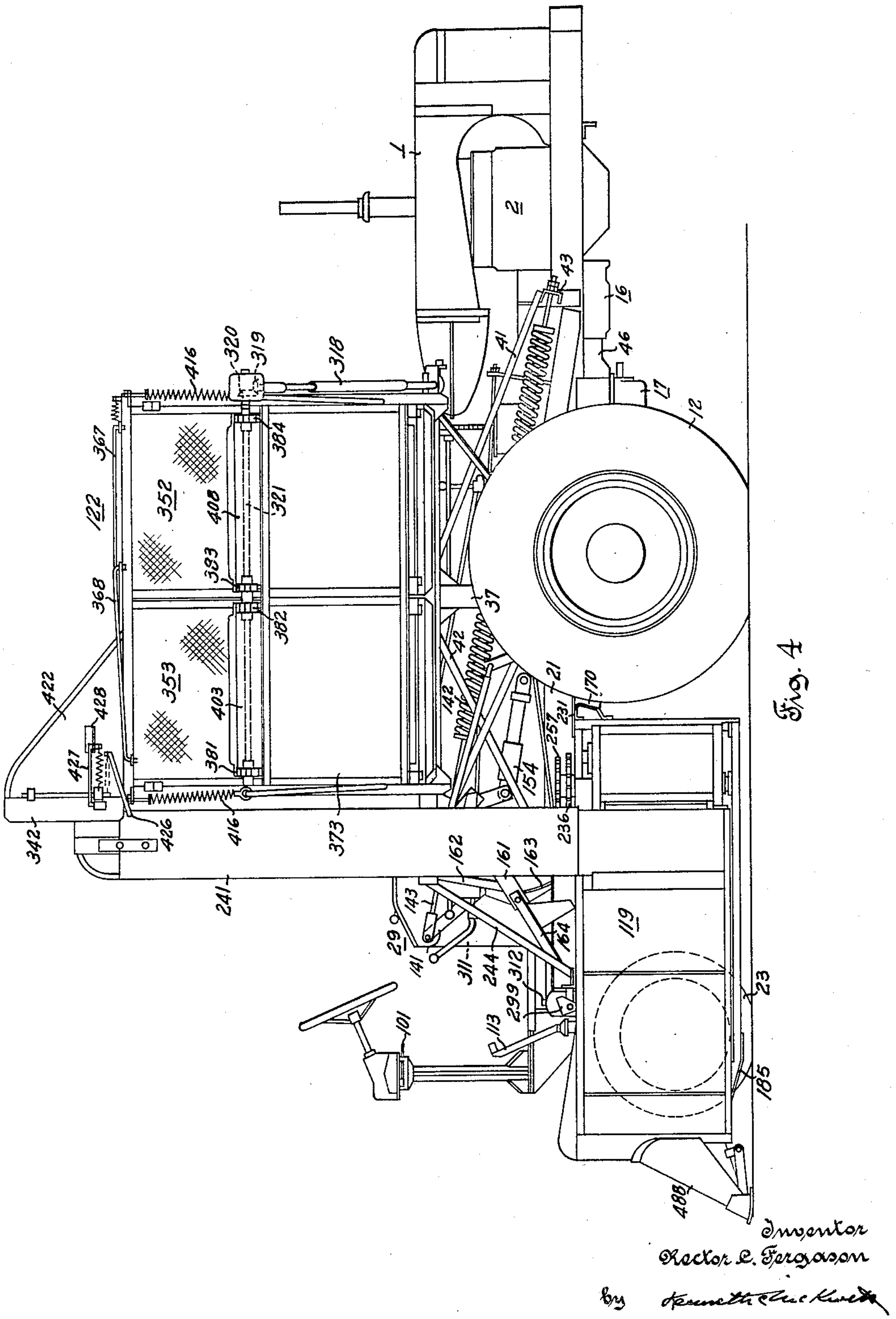
Fig. 4 is a side view of a cotton harvester including the tractor shown in Figs. 1-3.

Figs. 4, 5, and 6 of the drawings show a self-propelled harvesting machine comprising the previously described tractor, cotton picking units 119 mounted on both sides of frame member 21 with the plant receiving, throat forming portions 121 of the units positioned adjacent the operator's station 29, and a picked cotton receiving basket 122 mounted on a support frame positioned just forwardly of the axle of traction wheels 12 so that the weight of the basket and the harvested material confined therein does not affect the stability of the machine regardless of the amount of harvested material present in the basket. And in this connection it will be apparent that when the machine is moving up an incline the center of gravity of the basket load will shift rearwardly over the axle thereby providing greater traction for the drive wheels when such increased traction is desired.

In mounting the basket 122 and picking units 119 use is made of a pair of longitudinally extending basket supporting frame members 123 and 124 (see Figs. 20 and 21) having approximately mid-portions thereof supported by the upper ends of channel members 37. The forward portions of frame members 123 and 124 are supported by diagonally depending brace members 126 (only one of which is shown) having their lower ends secured to plates 36 adjacent the associated channel member and having their upper ends fixed to frame members 123 and 124 through suitable gusset plates 127 affording a rigid connection between tube member 31 and frame members 123 and 124. The rear ends of frame members 123 and 124 are rigidly united by a basket supporting cross frame member 128. Three hinge elements 129 are fixedly secured to longitudinally spaced portions of frame member 124, these elements pivotally receiving the hinge elements 131 (see Fig. 57) attached to the frame of basket 122. The rear ends of frame members 123 and 124 are additionally braced by members 132 having their lower forward ends secured to plates 36.

A transversely extending tube 133 (see Fig. 10) is rigidly supported by a forwardly extending flange 134 carried by tube 31 and by a plate 136 which rigidly unites the forward end of frame member 123 with an intermediate portion of tube 31. Tube 133 rotatably supports a shaft 137 having a crank element 138 at one end thereof fixedly mounting a stub shaft rotatably supporting a roller 139 and having a lever 141 fixed to the other end thereof. A counterbalancing spring 142 connects the upper end of lever 141 with the fixed bracket 43 on engine frame 3. A rod 143 has its forward end pivotally connected to a mid-portion of lever 141 and its rear end slidably passes through a pin 144, withdrawal of this rod being prevented by a spring 145 which surrounds the rod in interposed relation between pin 144 and a nut 146 on the threaded rear end of rod 143. Pin 144 is pivotally supported by a pair of spaced parallel arms 147 fixed to a sleeve 148 which is in turn rotatably supported on a transversely extending shaft element 149 fixedly attached to rigid brackets 151 carried by longitudinally spaced portions of tube 31. A half bushing support is provided for a mid-portion of sleeve 148 by an additional bracket 152 carried by tube 31 as indicated in Fig. 10. A pair of arms 153 are attached to sleeve 148 on opposite sides of bracket 152 and have their other ends pivotally attached to a hydraulic ram 154 which is in turn pivotally attached to a support 156 carried by longitudinal pipe member 21.

Referring to Fig. 9, tube 31 carries an angle iron 157 and a plate 158 affording a support for a fixed shaft 160 which pivotally mounts a sleeve 159 having a tube 161 attached thereto as by welding. A lever arm 162 and a cam shoe 163 are fixedly attached to tube 161 with the cam shoe positioned to coact with roller 139. The front end of each cotton picker unit 119 (note Figs. 20 and 21) is attached to a supporting yoke 164 which in turn is attached to a shaft 166 extending through a sleeve 167 fixedly attached to the lower end of tube 161. A link 168 is pivotally attached to and connects the upper end of lever arm 162 with the upper arm of a bell crank lever 169 pivotally supported on a stub shaft 171 rotatably carried by the plate 36 and a laterally spaced bracket 172, the latter being attached to transverse frame member 19. The rear end of each picking unit 119 is supported by a bracket 170 pivotally attached to the lower arm of bell crank lever 169 for pivotal movement about stub shaft 171. The relationship between the lower arm of bell crank lever 169 and tube member 161 is such that at all times they remain parallel due to the spacing provided by link 168 and as a result, the unit 119 remains substantially parallel to the ground as it is raised or lowered.

Figure 20:
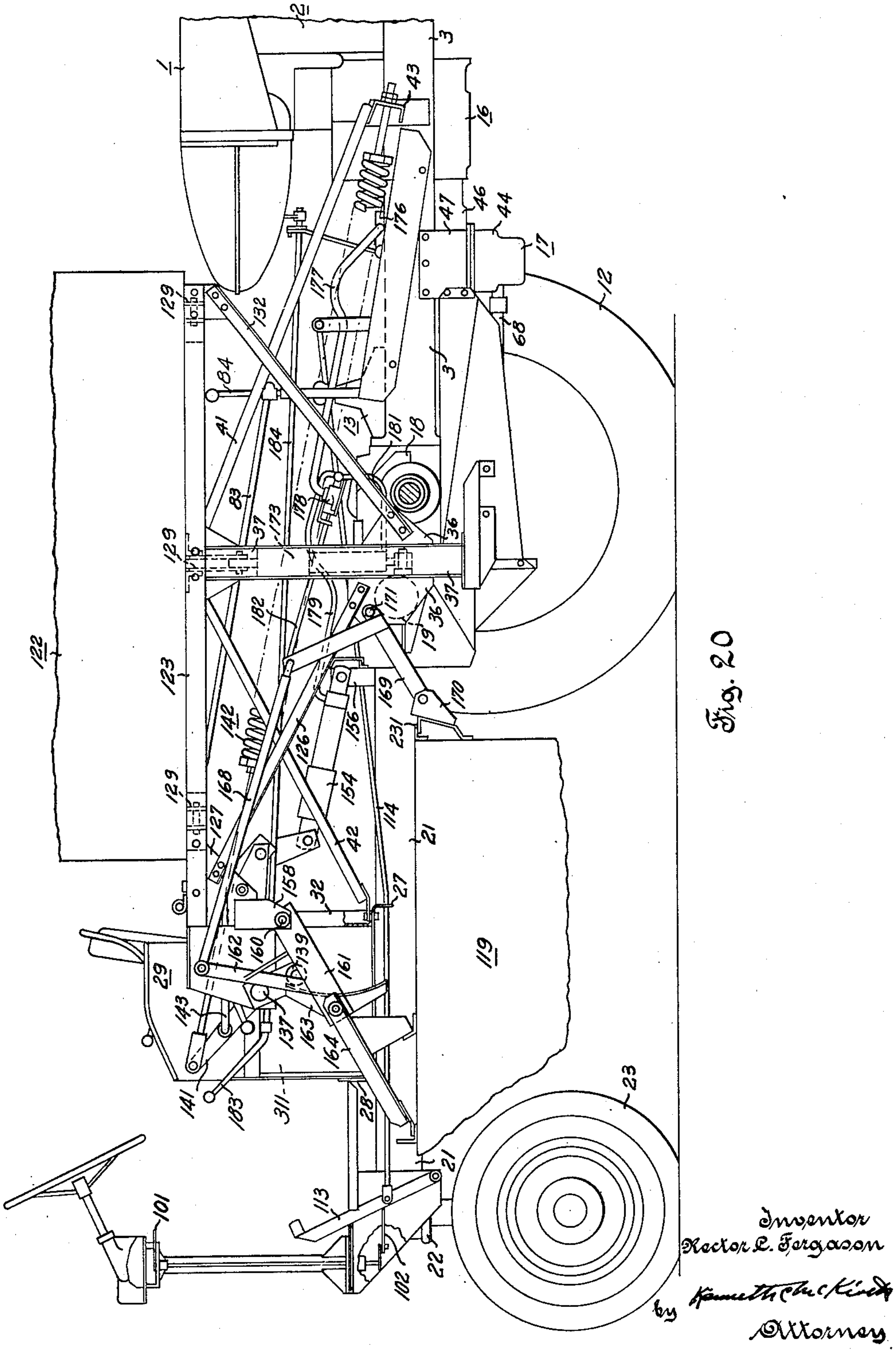
Fig. 20 is a side elevation of the frame structure and elements associated therewith, left rear wheel omitted.
Figure 21:
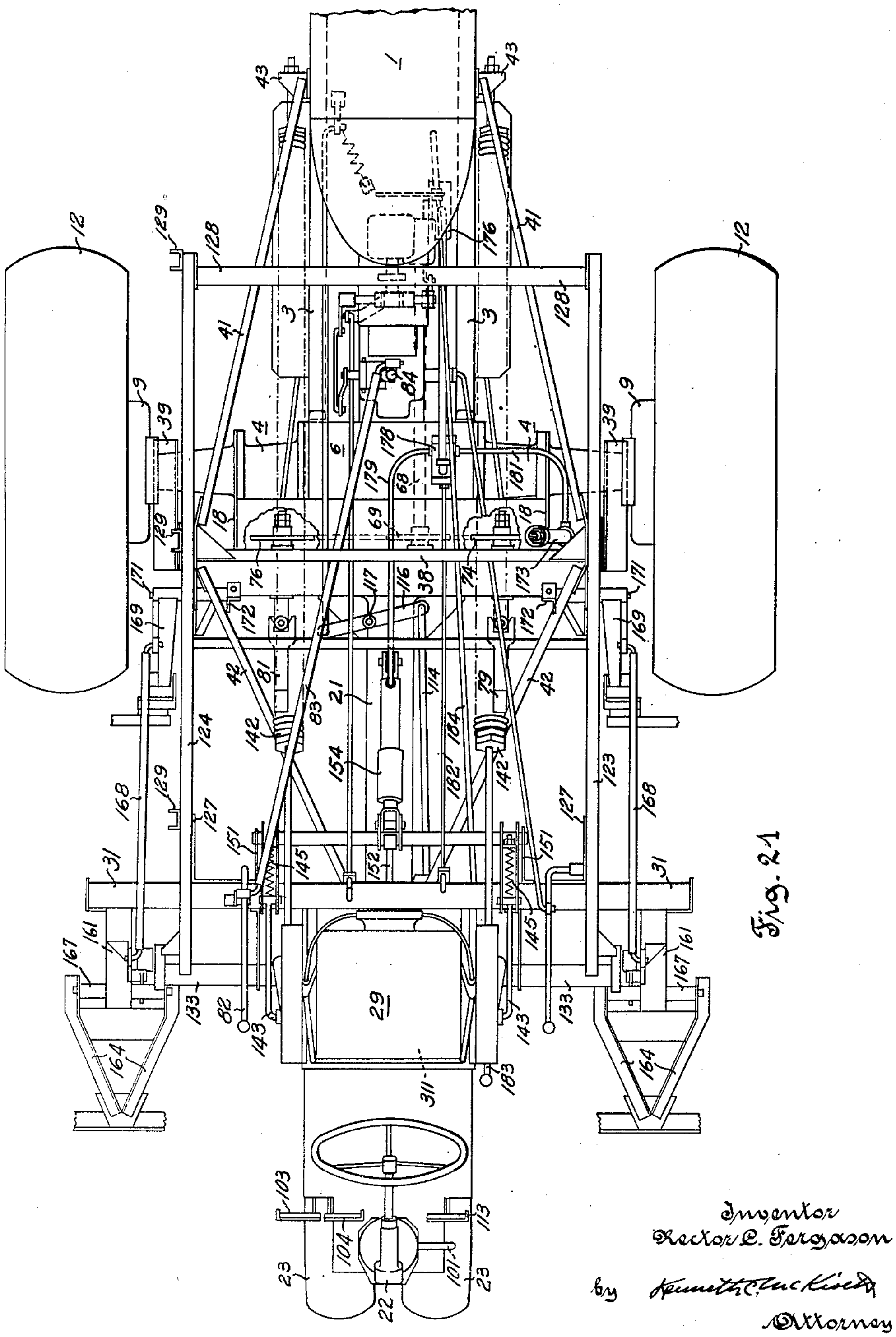
Fig. 21 is a plan view of the structure shown in Fig. 20.

Referring to Figs. 20 and 21, hydraulic ram 173 is connected to a hydraulic pump 176 supported on transmission housing 46 and operated by engine 2 through a conventional means (not shown). A flexible pipe 177 hydraulically connects the pump to a three-way valve 178 selectively controlling the flow of fluid through tubes 179 and 181 connected with the implement raising ram 154 and with the basket elevating ram 173, respectively, the latter being pivotally carried by a bracket 174 (Fig. 18) attached to transverse tube 19. Three-way valve 178 has a control element 182, the operating end of which is carried by tube 31 adjacent the operator's station. Control element 182 can be actuated to operate either ram 154 or ram 173. A control element 183 carried by tube 31 is connected to pump 176 by means of rod 184 and controls same for raising or lowering either ram as desired or maintaining either ram in any desired position of adjustment. It is understood of course that the three-way valve 178 must be properly positioned to establish a hydraulic connection with the ram desired to be raised, lowered or held in a selected position.

In raising the cotton picking units 119, three-way valve 178 is moved to a position activating hydraulic ram 154. Hydraulic pump 176 is actuated to extend ram 154 which in turn pivots sleeve 148 in a clockwise direction as viewed in Fig. 8. Arms 147 carried by sleeve 148 compress spring 145 against nut 146 and move rod 143 to the right causing lever 141 to pivot shaft 137 and crank arm 138 carrying roller 139. Roller 139 moves clockwise against cam shoe 163 thereby causing tube 161 to pivot clockwise about its support 160 and raise the unit. As the lifting mechanism of the rear end of the unit is directly connected to shoe 163 by means of link 168, the rear end raises at the same time as the front end and at the same rate. And since supporting yoke 164 is attached to picking unit 119 with the pivoted end of yoke 164 approximately above the center of gravity of the picking unit, practically all the weight of the unit is lifted through yoke 164, and the rear support for the picking unit merely stabilizes the lift mechanism preventing lateral torsion and assures that the front end of the unit raises at the same time the rear end of the unit raises.

During the raising of the units, the counterbalancing spring mechanism 142, which has been supporting most of the weight of the unit when the aforesaid units are in their lower position, continues to support substantially the same amount of weight for any adjusted position of the units. Referring to Fig. 8, the torque about shaft 137 must be equal to the torque about shaft 160 for all positions of the picking unit 119, in order for the unit to be properly counterbalanced. Practically, this condition of perfect balance is not desired and consequently the counterbalancing means provided does not quite balance the unit. The reason for this is that it is desirable that the unit have sufficient unbalanced weight so that when the ram 154 is released to lower the units, the unbalanced weight of the individual units will provide enough force to overcome the frictional losses in the lifting and supporting mechanism and to descend of their own accord to the position regulated by the lifting mechanism or by the ground. As indicated in Fig. 8, as the unit is lifted or lowered, the weight of the unit remains constant but the effective lever arm about shaft 160 varies and therefore the torque also varies. To substantially balance this torque, spring mechanism 142 and lever 141 are provided. However, as the unit is raised or lowered the spring tension and the effective lever arm of the spring both vary but not at the same rate. Therefore crank arm 138 has been provided with the cam following roller 139 which contacts cam 163, carried by tube 161, in order to compensate for this difference in variation. Cam 163 is so designed in relation to the three previously mentioned variables that the torque about shaft 137 is always substantially equal to the torque about shaft 160 for any position of the picking unit. Before picking operations start the units are customarily lowered until the sled runner 185 (Fig. 4) attached to the bottom of the unit just contacts the ground. During operation, the unit will follow the contour of the ground since the coaction between cam shoe 163, roller 139, crank arm 138, lever 141 and spring mechanism 142 is such that the effective lifting force applied to the unit through spring 142 is substantially constant for all positions of the unit. That is, it requires no more force to lift the units the last two inches of its normal range of motion than it takes to lift the unit the first two inches of such range despite the fact that the spring has considerably more potential energy stored therein when the picker is in the latter position.

As indicated in Fig. 4, each picking unit 119 has a sled runner 185 attached to the bottom plate 186 of the picking unit and this runner contacts the ground when the unit is in its picking position. Each unit is mounted with its front end slightly higher than its rear end so that if an obstruction is met the sled runner and unit will tend to raise up and ride over the obstruction rather than to destructively dig into it. If either picking unit should strike an obstruction, the vertical component of the striking force coupled with the action of the counterbalancing mechanism results in a raising of the striking unit independently of the other unit. When a picking unit raises up due to contact with an obstruction, the ram mechanism including arms 153, sleeve 148, arms 147 and pivot pin 144 does not move at all since a clockwise movement of lever 141 as viewed in Fig. 8 causes rod 143 to move to the right sliding through pivot pin 144. After the obstruction is past, the picking unit returns to its former position as determined by the ram mechanism, the shock of its return being cushioned by spring 145. And since the bulk of the weight of the picking unit is carried by the counterbalancing spring, this shock force is not of great moment and is readily dissipated by the compression of spring 145.

Each picking unit 119 is provided with an opening 121 for receiving the plant row, the opening being on the side of the unit adjacent either side of longitudinal frame member 21, therefore, the units may be considered as formed in pairs having symmetrical right and left hand characteristics and for the sake of avoiding repetition only one of the units will be described. The units are mounted so that two adjacent rows of cotton will be picked at the same time without interfering with other rows. And as will be described later, the units are laterally adjustable to handle plant rows spaced apart different distances.

Figure 22:
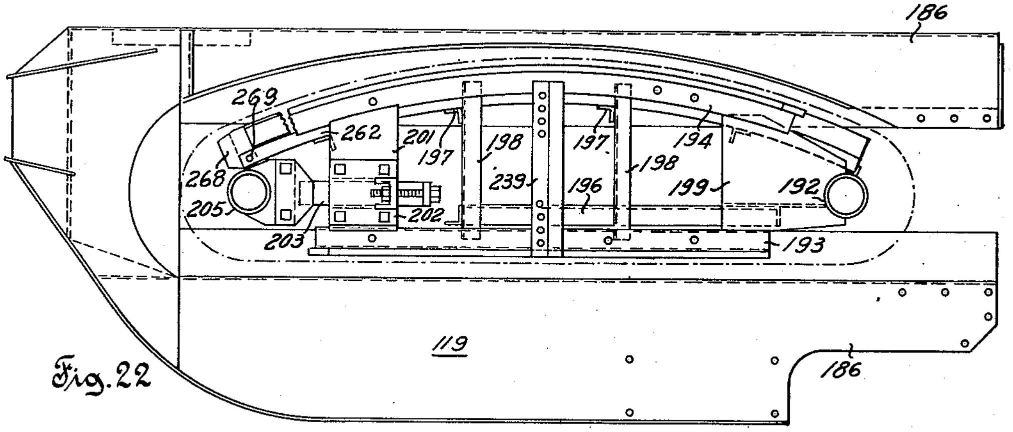
Fig. 22 is an enlarged plan view of the left hand picker frame unit.
Figures 23, 24, 25, 26, 27:
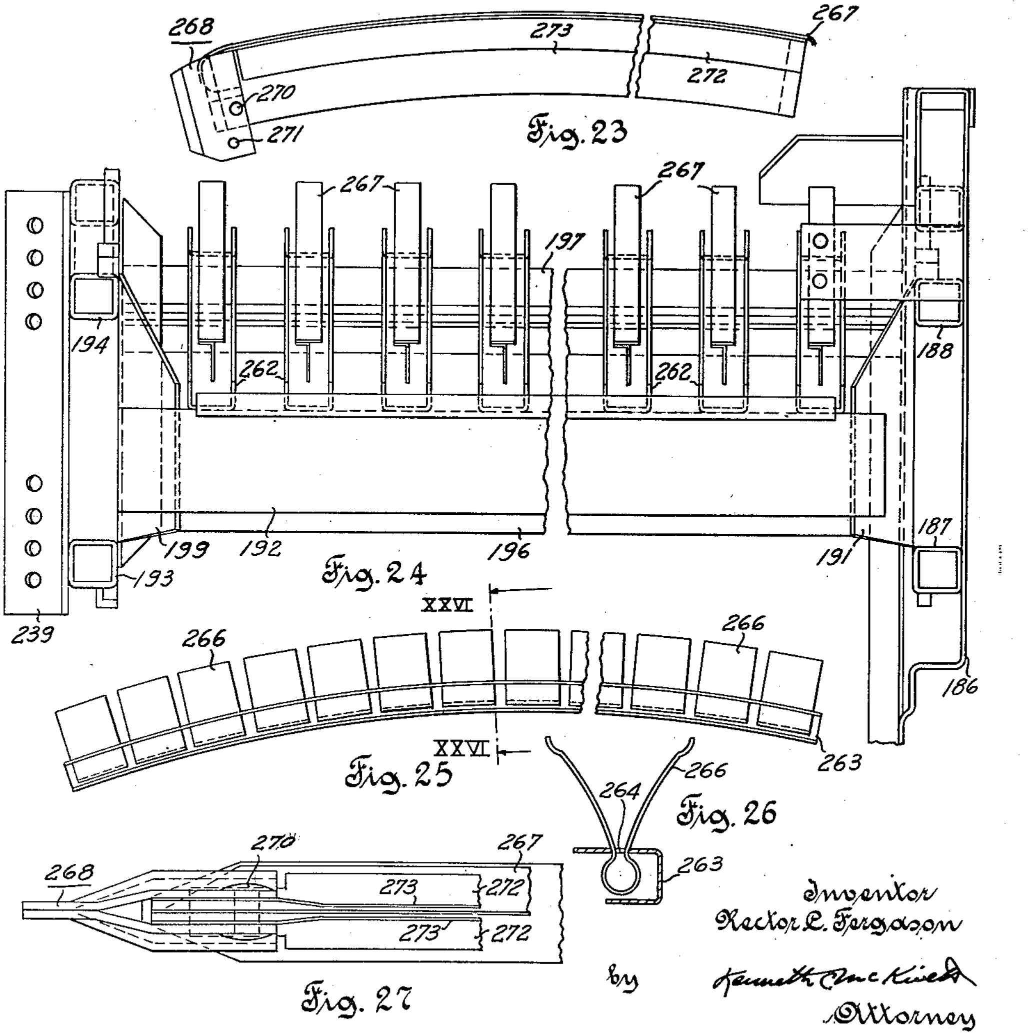
Fig. 23 is an enlarged plan view of a spindle drive track group.
Fig. 24 is an enlarged rear end view of the spindle drive track rub strips (each strip being an element of a spindle drive track group) shown in position on the inner frame unit.
Fig. 25 is an enlarged plan view of a spindle track spring assembly.
Fig. 26 is an enlarged section taken along line XXVI—XXVI of Fig. 25.
Fig. 27 is a partial side view of the spindle drive track group shown in Fig. 23.

Each cotton picking unit 119 has a bottom plate 186 (see Figs. 22, 24 and 29) which is reinforced by longitudinal extending tubes 187 and 188. Tubes 187 and 188 are horizontally spaced apart by cross braces 189 (Fig. 29) and at their front ends, tubes 187 and 188 are connected by plate 191 and at the rear end by a plate which is not shown. Rear plate 191 rigidly supports a vertically extending pipe member 192. Longitudinally extending tube members 193 and 194 (see Fig. 24) are supported in spaced overlying relation to tube members 187 and 188, respectively, and are horizontally spaced apart by braces 198 (see Fig. 22) and by rear and front plates 199 and 201, respectively. Plate 199 is similar in construction to and overlies rear plate 191 and is also rigidly attached to pipe member 192. Front plate 201 has attached thereto a bracket member 202 slidably receiving a tube member 203 which is rigidly attached to one end of a vertically extending pipe member 205, bracket member 202 and tube 203 being threadably connected permitting tube 203 to be adjusted longitudinally relative to bracket member 202. A front plate (not shown) is connected to tube members 187 and 188 in spaced underlying relation to plate 201 and carries a bracket (not shown) which slidably receives a tube (not shown) which is supportingly attached to the lower end of pipe member 205, this plate, bracket and tube being constructed and arranged similarly to plate 201, bracket 202 and tube 203 to perform the same functions whereby pipe member 205 is rigidly supported and may be moved toward or away from pipe member 192. Journaled in pipes 192 and 205 are shafts 204 and 206, respectively, shaft 204 having at the upper and lower ends thereof sprockets 207 and shaft 206 having at the upper and lower ends thereof sprockets 208 (see Figs. 28, 36, 38, 39, 40 and 41) around which pass the upper and lower chains 209 and 211, respectively. It should be here noted that the tension in chains 209 and 211 can be adjusted by moving pipe member 205 closer to or farther away from pipe member 192. These chains are united by a series of vertically arranged, longitudinally spaced slats 212 having end hinge elements 213 connected to chains 209 and 211 by pins 214 extending therethrough and form an endless band or carrier for the spindles 217 which are journaled for rotation in the slats. Pivotally attached to lower chain 211 (see Fig. 40) are spindle protecting fingers 218 which guide the cotton plants through the picking unit and will shear off cotton plants engaged thereby should the units be operated while the machine is stationary. The lower chain links have an outwardly extending spindle guard supporting and bracing portion 219. This slat carrier as a whole moves in the elongated generally oval path indicated in Fig. 28 and the functions of moistening the spindles, extracting the cotton from open bolls, and the subsequent removal of the cotton from the spindles occurs incident to the travel of the spindle carrier about this elongated path will be more fully explained presently.

A housing enclosing the working parts of each unit consists (see Figs. 28 and 29) primarily of bottom plate 186, the outer rear end wall 221, side wall 222 and the longitudinally extending elements 223 forming a horizontally slotted inner wall 224 between the picking mechanism and the row of plants to be picked and another wall 226 is pivotally mounted on frame members 233 and 238 and is biased by means of spring loaded rod 240 toward the picking spindles 217 to function as a plant crowder maintaining the cotton plants in contact with the picking portions of the spindles, this plant crowder coacting with inner wall 224 to form a plant receiving passage 227. At the front end of this tunnel the walls diverge forming a mouth 121 to gather in the plants as the machine travels along the row. As will be seen by reference to Fig. 29 the spindles project through horizontal spaces in the inner wall 224 into and entirely across the picking tunnel 227 at certain portions thereof. Further, the bowed shape of the endless spindle carrier path on the picking side of the inner frame causes the spindles 217 to gradually move into and out of the plants as the latter enter and leave the picking tunnel, respectively. The rear of the picker unit has an end wall 221 carried by bottom plate 186 and provided with a rearwardly bent upper portion 228 (Figs. 28 and 36) which functions as a shield to prevent mud thrown up by the traction wheels 12 from landing on the picker unit. Attached to the upper end of end wall 221 is an angle iron 229 carrying a bracket member 231 which serves as a rear support for the picker unit (Fig. 20). This bracket 231 is detachably connected to bell crank 169 of the lifting mechanism as by bolts and nuts through a series of horizontally spaced, vertically slotted holes (not shown) in bracket 231 which permits vertical adjustment of the rear end of the picker unit relative to the front end. This series of horizontally slotted holes also permits a transverse adjustment of the picking unit on the lifting mechanism so that cotton rows of various widths can be harvested.

A power transmitting unit 232 is carried by a bracket attached to one end of frame member 233 which is carried by tube members 193 and 194, said transmitting unit having a vertical shaft mounting a sprocket member 234 chain connected to a sprocket 236 carried on an upper portion of shaft 204 for driving the unit and having a rearwardly extending universally connected spline shaft 237 adapted for detachable connection with the generally aligned one of the tractor power take-off shafts 72 and 73. Yoke member 164 (see Figs. 4, 28 and 29) has its apex adjustably attached to angle iron 238 and is provided with a depending plate-like intermediate part 235 similarly attached to laterally spaced portions of angle iron 239, the latter forming a part of the upper frame structure of the picking unit and being carried by tube members 193 and 194. This yoke serves as a front support for the picking unit, and it will be noted that angle irons 238 and 239 have a series of transversely spaced holes therein permitting the unit to be shifted laterally to the supporting and lifting mechanism (similar to the lateral adjustment of the rear support) for adjusting the picking units for handling cotton rows of varying widths. A picked material elevating device 241 is carried by base plate 186 and is suitably braced by horizontally extending angle iron 242 carried by tube member 193, by longitudinally extending frame member 243 connected to the forward portion of side wall 222 and end wall 221, and by upwardly extending triangular brace 244 (Figs. 36 and 37) carried by angle iron 238. The upper end of elevating device 241 carries a box 246 enclosing gearing comprising a rotatable shaft 247 which extends through the elevating device and mounts a pulley 248 disposed therein. A similar pulley and shaft (Fig. 38) are rotatably received in the bottom portion of the elevating device 241. An endless belt 249 having paddle elements 251 thereon passes about pulleys 248. An inclined floor member 252 is carried by plate 186 adjacent the intake side of the lower end of elevating device 241 and serves to direct harvested material which has fallen from the stripping devices into the elevating device. The material receiving opening in the elevating device (partially shown in Fig. 38) extends from floor member 252 to the top of side wall 222. A vertical shaft 253 has its upper end drivingly connected with the gearing within box 246 and has its lower end journaled in a plate 254 attached to tube member 233 (Fig. 28) as by welding. Attached at the lower end of shaft 253 is a sprocket 256 which is drivenly connected by means of chain 258 to sprocket 257 carried by the upper end of shaft 204.

Figures 31, 32, 33, 34, 35:
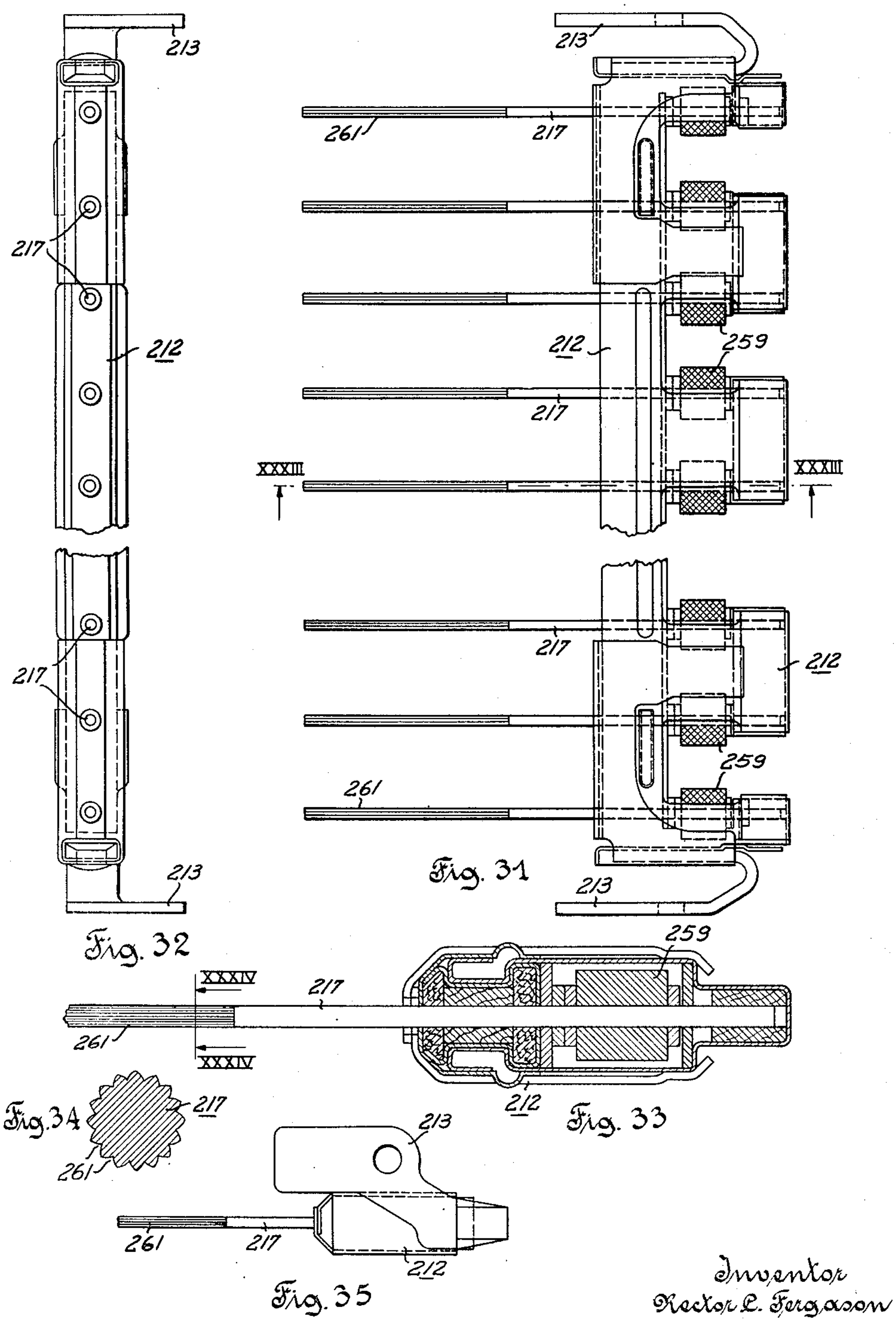
Fig. 31 is an enlarged side elevation of a slat assembly.
Fig. 32 is a view of the left end of the slat assembly shown in Fig. 31.
Fig. 33 is an enlarged section taken along the line XXXIII—XXXIII of Fig. 31.
Fig. 34 is an enlarged section through the picking portion of the spindle taken on line XXXIV—XXXIV of Fig. 33.
Fig. 35 is a view of the bottom of the slat assembly shown in Fig. 31.

The structure of the individual slats 212 is not described in detail as these slats may be constructed in accordance with the teachings of U. S. Patent, Rust, 2,440,450. Referring to Figs. 31 through 35 it is seen that spindles 217 are generally elongated cylindrical members having an enlarged knurled cylindrical portion 259, adjacent one end thereof, this end portion of the spindle being rotatably supported in suitable bearings carried by the slat 212 with part of the knurled portion of the spindle exposed for engagement with a means such that a relative movement therebetween is operative to effect rotation of the spindle. The picking end of the spindle has flutes 261 therein which extend longitudinally so that a cross sectional view of the picking area of the spindle presents a series of pointed arches as is shown in Fig. 34. It has been found that this type of configuration is very effective in that it picks cotton more efficiently than a spindle of circular cross section, retains moisture on the picking surface longer, can be stripped of picked cotton very readily, and does not require sharpening or roughening. And in addition, when the point of the arch becomes worn down, an additional stripping edge is thereby produced to act as a cotton contacting edge.

Figure 29:
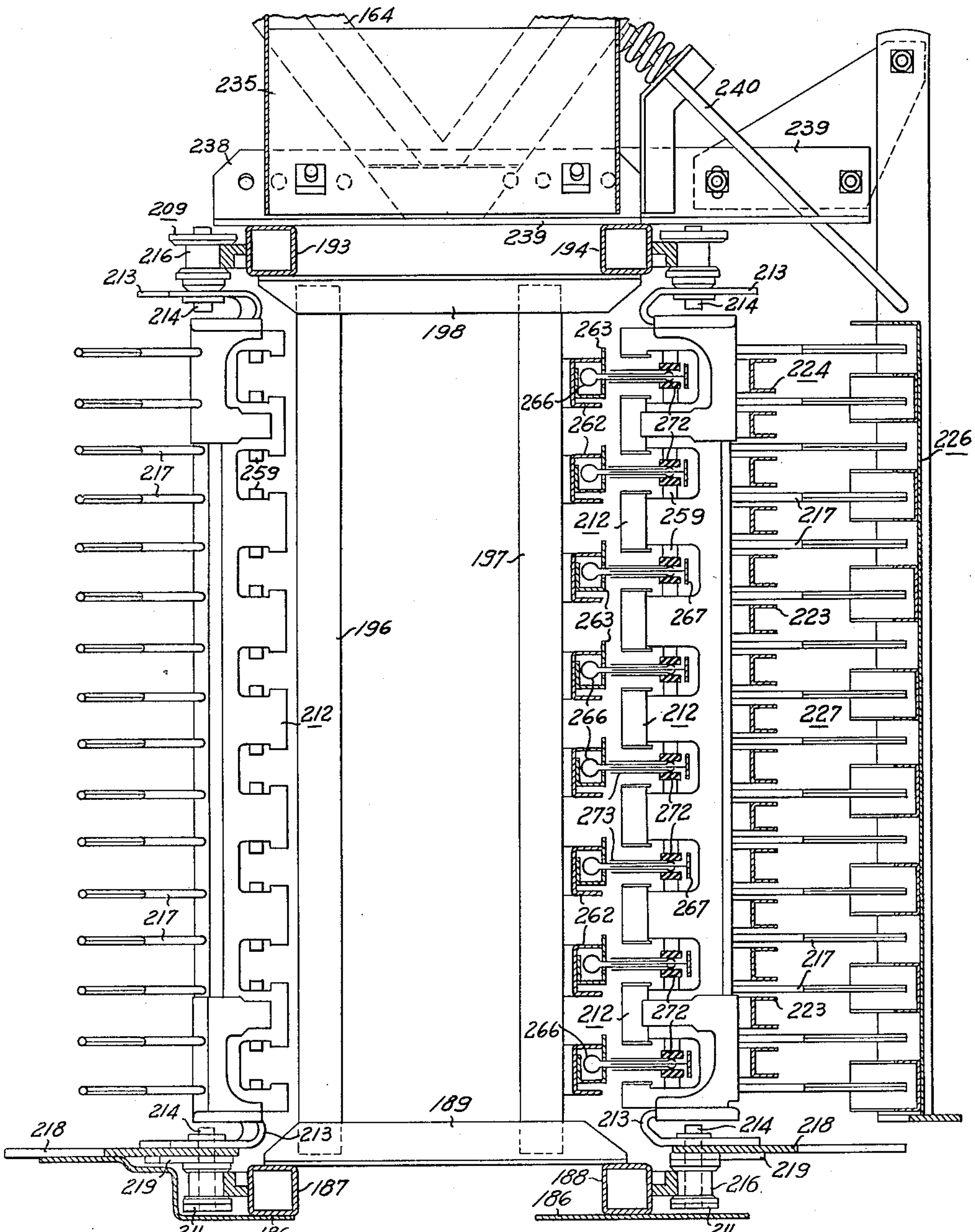
Fig. 29 is an enlarged section through the left hand picker unit taken along the line XXIX—XXIX of Fig. 28.
Figure 30:
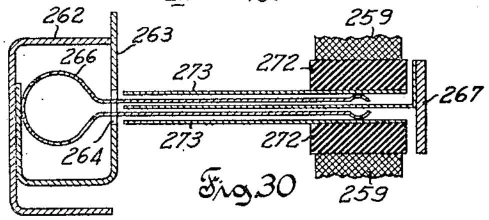
Fig. 30 is an enlarged view with parts broken away and shown in section of one of the spindle track spring and associated parts shown in Fig. 29.

A series of horizontally longitudinally extending vertically spaced U members 262 (see Figs. 23 to 30) are attached to pipe member 192 and to angle members 197. Each U member 262 supports a U channel 263 which is turned on its side relative to member 262 and has a series of aligned longitudinally extending slots 264 through the outer leg thereof. A spring 266 comprising a pair of flat leaves united by a bulbous base portion is positioned in channel 263 with the leaves projecting through a slot 264 and with its bulbous base portion disposed between the legs in underlying relation to the slot, there being one such spring inserted through each slot. And in this connection it will be noted that the inner leg of channel 263 is considerably shorter than the slotted outer leg thereof which permits insertion of the springs through the slots 264 before channel 263 is positioned within channel 262, as shown. A T-shaped track rub strip 267, which has a coupling member 268 on one end thereof, is positioned with its stem portion disposed between the leaves of springs 266 by a vertically extending rod (not shown) passing through a vertical line of holes 269 in the corresponding ends of U members 262 and through holes 271 in coupling member 268 alignable with the holes 269 in members 262. Outside of each pair of the horizontal series of oppositely facing surfaces presented by the leaves of each series of springs 266 and extending longitudinally coextensive with the rub strip 267 are two spindle roller tracks 272 which are engaged by the exposed knurled portion of a spindle and which are made of a resilient material, such as rubber, and attached to backing plates 273 (Fig. 30), these tracks being biased outwardly by the action of springs 266. Preferably, opposite free end portions of the spring leaves are bowed outwardly to accentuate this biasing action. Each pair of backing plates 273 is secured to opposite sides of a coupling 268 by any suitable means such as a rivet 270 and these assemblies, i. e., rub strip 267 and the associated tracks 272, are retained in the shown relationship by means of the rod inserted through the holes 271 in couplings 268 and through the holes 269 in the corresponding ends of U-members 262, and by means of the coaction of the spindle carrying slats inserted between the adjacent assemblies.

As the slats 212 move into picking engagement with the cotton plants the knurled portions 259 of the spindles 217 contact the spindle roller track 272 and as the slats move about their track the frictional engagement between the knurled portion of the spindle with the spindle driving track rotates the spindles which in turn contacts the open bolls of cotton wrapping the cotton about the spindle and thereby extracting the cotton from the boll.

Figure 28:
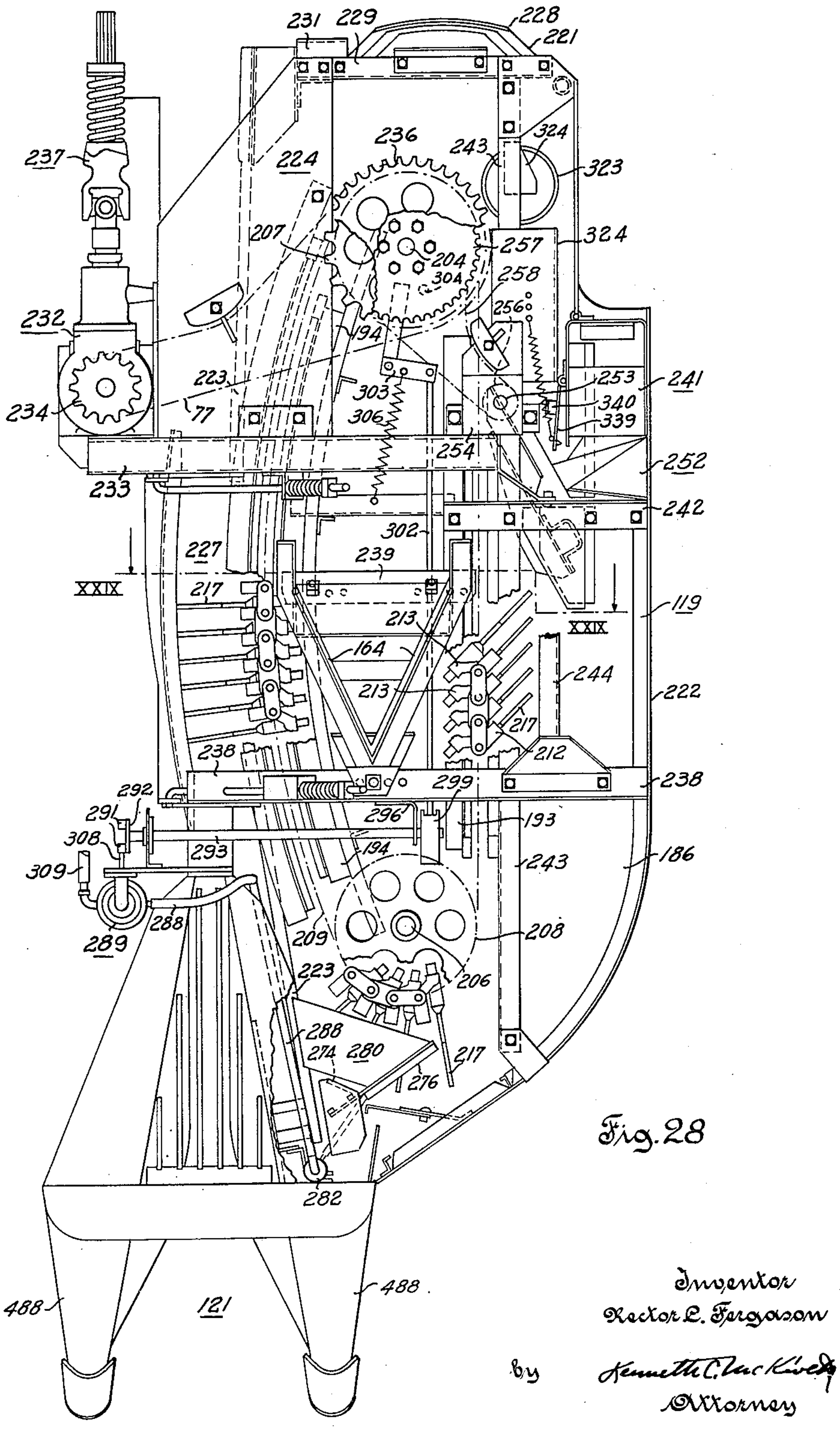
Fig. 28 is an enlarged plan view of left hand picker unit.

Attached to the front end of the picking unit is a throat member 121 which guides the cotton plants into the picking tunnel and also bends over tall cotton stalks so that the upper portions of the cotton plant will come in contact with the picking spindles operating in tunnel 227. Adjacent the throat member 121 (see Figs. 28 and 45) and carried by a vertically extending frame member 274 supported on plate member 186 is a series of spindle moistening pads 276, each of which may consist of several layers of resilient material 277 such as rubber clamped against a brace 278 projecting from frame member 274. A short hose member 279 is attached to each brace 278 in position to conduct water or other moistening fluid to the resilient material 277 by means of a channel forming clamp 281. Adjoining, resilient material members 277 extend sufficiently far from their respective clamping means so that when a picking spindle is not therebetween, the adjacent ends of the resilient members are in contact and function to maintain water therebetween and between the layers of the individual moistening pads by hydroscopic action. The picking spindles 217 pass between adjoining moistening pads 276 and upon contacting same become moistened, assuming the pads are wet, just prior to the spindle entering the picking tunnel 227. Attached to each spindle moistening pad and extending laterally rearward therefrom to U channels 223, as indicated in Fig. 28, are generally parallel plate members 280 designed to guide the spindles in traveling from the moistening device to their proper slot between spaced U channel members 223 (Fig. 29) thereby preventing a destructive contact between the spindles and U channel members 223 in the event any of the spindles should become bent.

Figures 41, 42, 43, 44, 45, 46, 47:
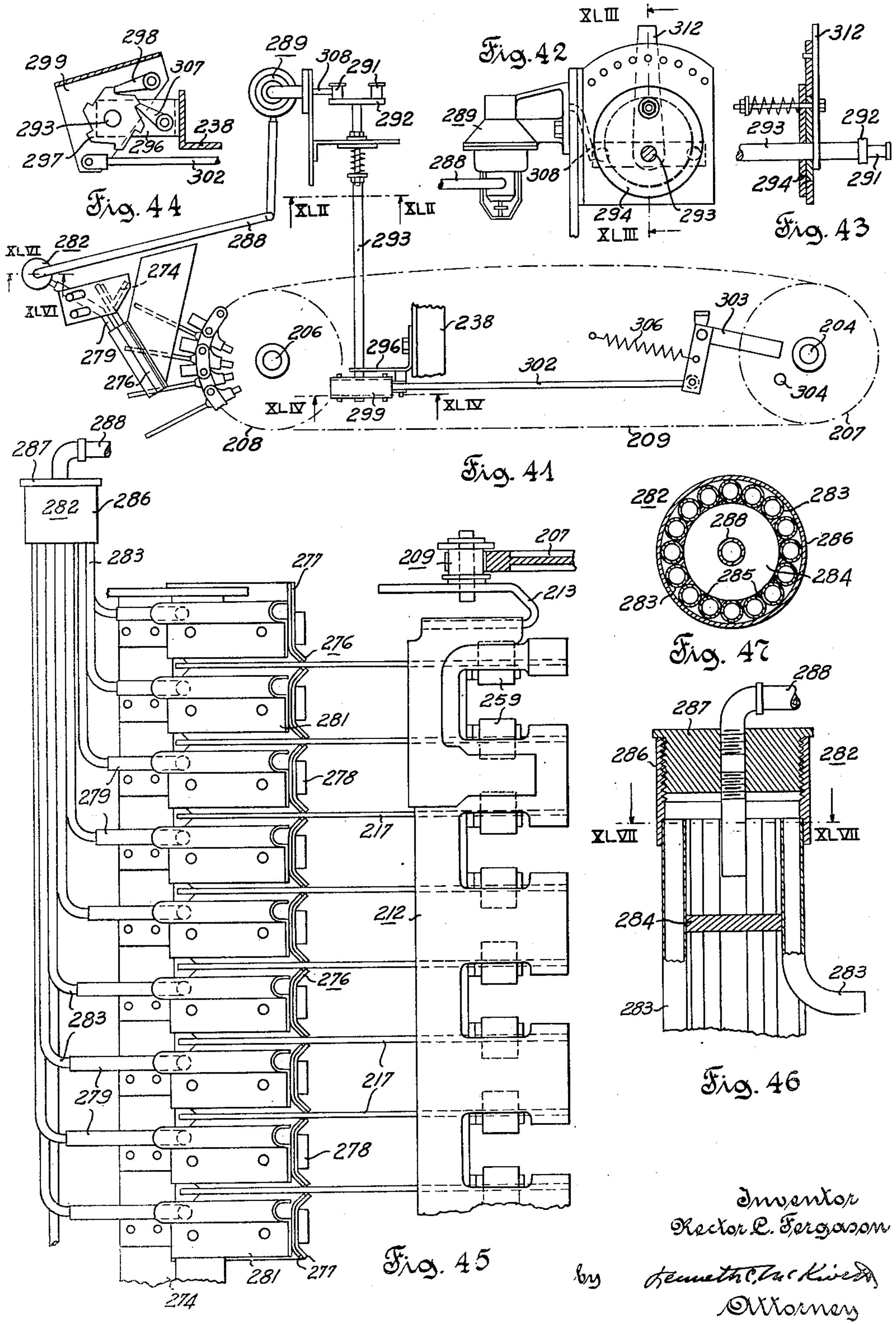
Fig. 41 is a plan view of the left hand moistener pump assembly.
Fig. 42 is an enlarged section along line XLII—XLII of Fig. 41 showing the pump and its operating mechanism.
Fig. 43 is a section along line XLIII—XLIII of Fig. 42.
Fig. 44 is a section on line XLIV—XLIV of Fig. 41 showing the ratchet mechanism.
Fig. 45 is an enlarged side view of a unit moistener assembly with spindles passing through moistening pads.
Fig. 46 is an enlarged section through moistener container on line XLVI—XLVI of Fig. 41.
Fig. 47 is a cross section along the line XLVII—XLVII of Fig. 46 showing construction of moistener container and feeder tubes.
Figure 48:
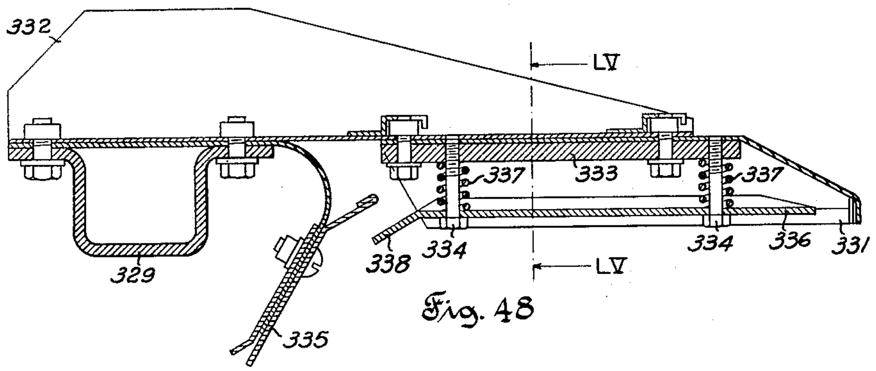
Fig. 48 is an enlarged horizontal section through a stripper and its support on line XLVIII—XLVIII of Fig. 39.
Figure 50:
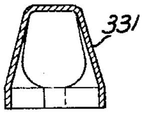
Fig. 50 is a section taken on line L—L of Fig. 49.
Figure 49:
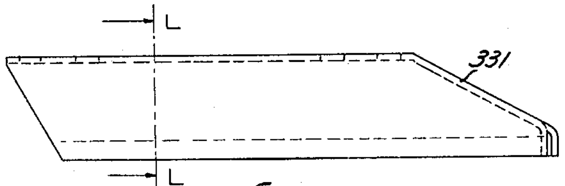
Fig. 49 is an enlarged side elevation of a stripper shoe.
Figure 51:
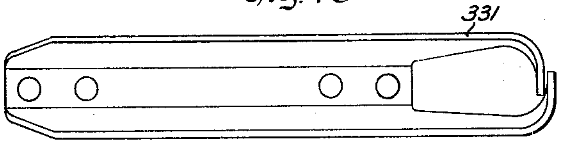
Fig. 51 is a plan view of the stripper shoe shown in Fig. 49.

Attached to frame member 274 (see Fig. 41) is a water distributing device 282 comprising a series of tubes 283 having one end of each tube disposed adjacent to and connected with the rubber tube 279 carried by a pad structure 276 and having their opposite end portions circumferentially surrounding an imperforate disc member 284 as shown in Figs. 46 and 47. The upper ends of the tubes 283 extend beyond disc member 284 and the upper portion of the tubes are so joined with each other and with the disc member, as by solder 285, as to form a water tight container 282 having the aforesaid disc as the bottom thereof. A jacket 286 surrounds the upper ends of the container and includes a centrally apertured cover member 287 through which extends a liquid supply tube 288 terminating below the level of the upper ends of tubes 283. Tubes 283 constitute overflow outlets from container 282 and since all tubes are the same diameter and all extend the same distance above the bottom wall of the container, the over-flow from the container will be the same to each tube. A liquid pump 289 is actuated by rollers 291 mounted on a bar 292 attached to a shaft 293 which is rotatably supported at one end by an eccentrically shiftable bearing carrying disc 294 and at its other end by a bracket 296 carried by cross brace 238. The outer end of shaft 293 (Fig. 44) mounts a ratchet wheel 297 which is actuated by a pawl 298 pivotally supported on a bracket 299 which in turn is pivotally mounted on shaft 293. A rod 302 has its forward end pivotally attached to the lower end of bracket 299 (Fig. 41) and has its other end (Fig. 28) pivotally attached to one arm of a spring biased bell crank 303 carried by an upper portion of the picking unit. A projection 304 on the upper slat drive sprocket 207 is positioned to engage the other arm of bell crank 303 each revolution and thereby pivot the bell crank against the bias of spring 306. This causes rod 302 to move to the right as viewed in Figs. 41 and 44 thereby pivoting bracket 299 counterclockwise about shaft 293 and causing pawl 298 to engage ratchet wheel 297 and turn same. The action of spring 306 returns bell crank 203 to the position shown in Fig. 41 when the latter loses contact with the projection 304 on sprocket 207, which in turn causes rod 302 to return bracket 299 and pawl 298 to the position shown. A pawl 307 pivotally mounted on bracket 296 functions to retain ratchet wheel 297 in the position to which it was moved by operating pawl 298. It should now be obvious that each complete revolution of sprocket 207 results in the pair of rollers 291 sequentially contacting one end of a pivoted lever 308 having its other end operatively connected with pump 289. A hose 309 connects the intake of pump 289 with a suitable source of water or other fluid, for example, a tank 311 under the operator's seat 29 (see Fig. 6). The amount of water being delivered to container 282 can readily be varied by adjusting the position of lever 312 attached to disc 294 which adjustment through the eccentric mounting of shaft 293 moves rollers 291 closer or farther away from lever 308 to thereby increase or decrease the pumping stroke as desired. From Fig. 4 it is seen that lever 312 is positioned close to the operator's station 29 and the operator can readily adjust the length of stroke to conform with operating conditions.

It should now be apparent that in applicant's embodiment a new and improved spindle moistening means has ben provided in that each spindle is provided with a substantially equal amount of moistening fluid, since the pressure head of fluid in container 282 is the same for all outlet tubes 283 and since the variation in the vertical length of these tubes merely compensates for the increased friction losses inherent in the longer tubes. In addition, it should also be apparent that the quantity of moistening fluid supplied to the spindles is proportioned to the speed of operation of the picking unit at all times and that the proportion may be varied, as desired, by adjusting the position of lever 312.

For example, if the picker is operated in first speed much less moistening fluid will be required and provided than if the picker is operated in second speed. And if the picker is stopped the flow of fluid to container 282 immediately stops. This last feature is a definite advantage over a gravity flow system in that with a gravity system fluid would continue to flow when the picker is stopped if the operator should inadvertently forget to shut off the fluid source. And in a gravity system the proper amount of fluid for operation of the picker in first speed would be entirely inadequate for operation in second speed without an adjustment of the needle valve metering the fluid to the spindle moistener and if the amount of fluid is adjusted for second speed operation there will be an excess of fluid provided if the speed of the picker is shifted to first speed to meet particular field conditions and thereby result in harvesting excessively moist cotton (which will bring a reduced price) and in corrosion of the picker parts contacted by the excess fluid.

In addition, a gravity system generally employs a needle valve or the like to meter the flow of fluid to the spindles and this flow is constant for a particular setting of the valve. Consequently, a very delicate adjustment of the needle valve is required to obtain the proper amount of flow as a relatively small amount of fluid provides the most efficient picking. Moreover, the water used in the moistening devices is sometimes contaminated with material which interferes with the efficient operation of a needle valve thus rendering it difficult to initially obtain the desired rate of flow and practically impossible to maintain such flow. In applicant's embodiment, the pump intermittently transmits fluid to the container 282 and the amount of fluid being delivered can be readily varied by moving lever 312 and once the correct rate of flow has been determined for any one speed and for the condition of the crop, this rate of flow will be correct for any other speed of picker operation thereby avoiding the nuisance of having to manually adjust the flow when different field conditions demand operation of the picker at a different speed.

Referring to Figs. 1, 3, 7, 56 and 59, it is seen that by means of operating rod 60 and the linkage connected thereto, sprocket 57 may be drivenly connected to power take-off shaft 52 as has already been described. Sprocket 57 by means of chain 313 is drivingly connected to a sprocket 314 mounted on a shaft 315 journaled in brackets carried by cross frame members 128 and 38. A conventional overload clutch (not shown) may be interconnected between shaft 315 and sprocket 314, if desired. Shaft 315 mounts a bevel gear 316 in mesh with a bevel gear 317 secured to the adjacent end of a telescoping shaft 318. The opposite end of shaft 318 mounts a bevel gear 319 in mesh with a bevel gear 320 attached to the adjacent end of a shaft 321 for driving the floor conveyer 322 of basket 122, the details of which basket and conveyer will be hereinafter described.

Figures 38, 39, 40:
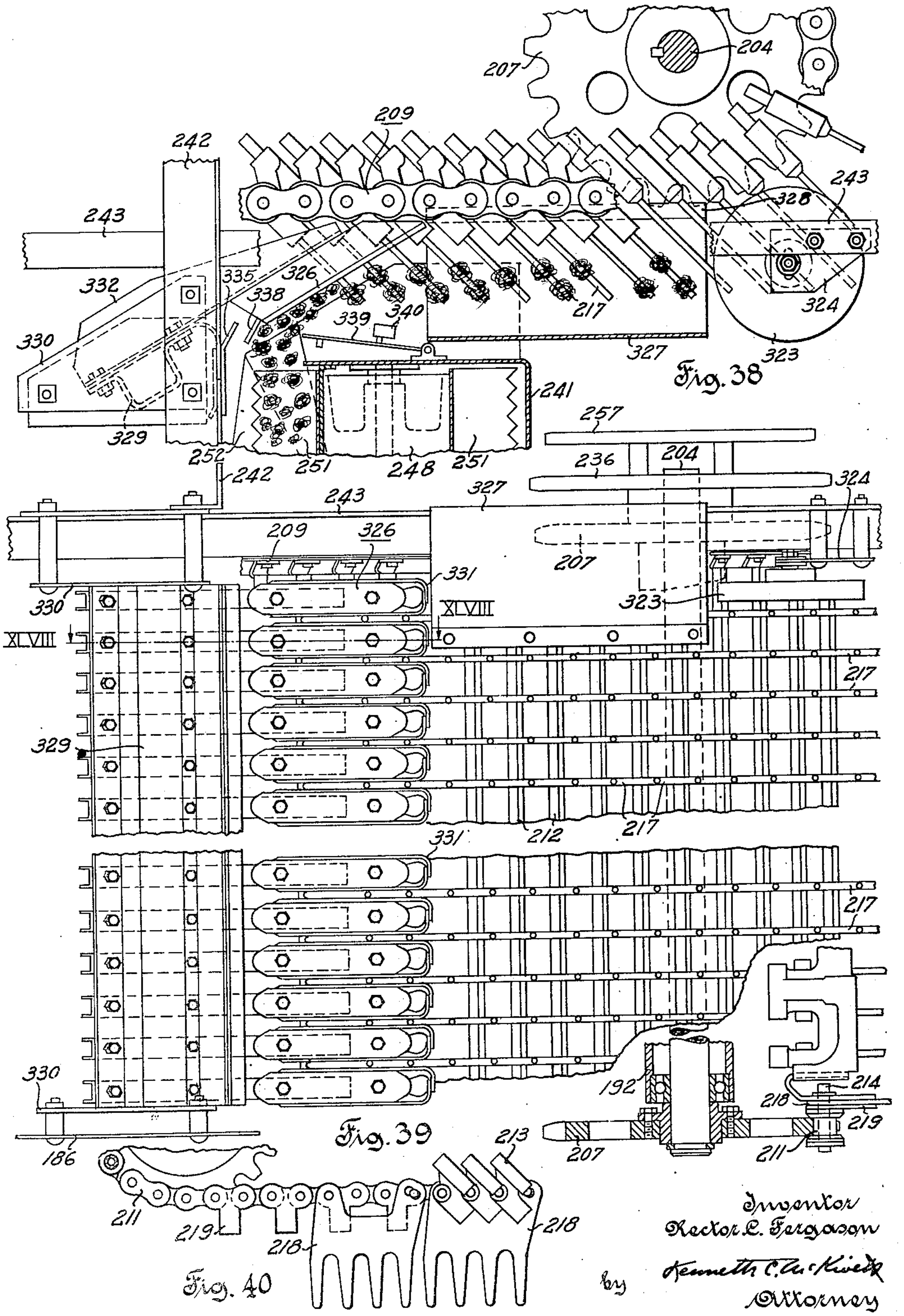
Fig. 38 is an enlarged plan view of the left hand stripper assembly in combination with slat positioning and slat retarding means and with the elevating conveyer, some parts being broken away and shown in section.
Fig. 39 is a side elevation of the apparatus shown in Fig. 38 with the conveyer omitted.
Fig. 40 is an enlarged fragmentary plan view of the slat bottom chain with parts successively removed to show the various elements thereof.

As indicated in Figs. 28 and 38, the slats 212 in passing around sprocket 207 tend to accelerate due to their pivotal connection with chains 209 and 211 and assume a radial position relative to the sprocket. And in order to avoid this action, a hold back disc 323 is rotatably mounted on a bracket 324, attached to frame member 243, in position to contact an upper end portion of each slat as it moves past the disc, such contact decelerating and positioning the slat with its spindles disposed at the proper angle for passing through the stripping device 326. Located in adjacent forward relation to hold back disc 323 and attached at its upper end to longitudinal frame member 243 is a U-shaped slat positioning member 327 which though having one leg 328 thereof in contact with a portion of the slats functions to maintain the slats positioned with their spindles disposed at the desired stripping angle as they enter stripping device 326.

Figure 52:
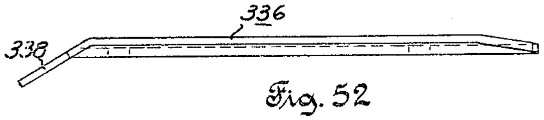
Fig. 52 is an enlarged side elevation of a stripper shoe spreader.
Figure 53:
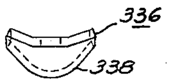
Fig. 53 is an end view of the stripper shoe spreader shown in Fig. 52.
Figure 54:
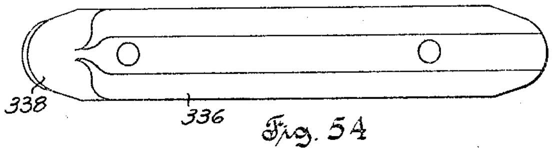
Fig. 54 is a plan view of the stripper shoe spreader.
Figure 55:
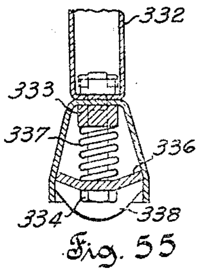
Fig. 55 is a section through a stripper assembly taken on line LV—LV of Fig. 48.

The stripping devices 326 (Figs. 39 and 48–55) are attached to a vertical channel member 329 having its opposite ends secured to bottom plate 186 and to frame member 242 through the medium of lower and upper gusset plates 330, respectively. Each stripping device includes a stripping shoe 331, generally V-shaped in cross section, bolted to a support 332 carried by the channel member 329. A stripping shoe anchor plate 333 is bolted to a vertically extending portion of support member 332 with a vertically extending portion of shoe 331 interposed therebetween. Plate 333 has holes tapped therein to receive a pair of bolts 334 supporting a spreader plate 336, the latter being forced into contact with the trough-shaped inner side walls of shoe 331 by tightening bolts 334. Preferably a compression spring 337 surrounds bolts 334 in interposed relation between anchor plate 333 and spreader plate 336, these springs acting to move spreader plate 336 outwardly relative to shoe 331 as the bolts 334 are loosened. The end of spreader plate 331 adjacent channel 329 is provided with an outwardly curved cotton deflecting portion 338, as indicated in Figs. 52 and 55. An additional deflector 335 is mounted on channel member 329 in adjacent coacting relation to deflector 338 so as to direct cotton into the intake opening of elevating conveyer 241 or onto the curved shield on floor plate 186 which slants downwardly to the lower end of the opening in the elevating conveyer 241. As previously indicated, the opening in the receiving end of the elevating conveyer extends from the floor to the top of the stripping devices and closely adjacent the discharge ends thereof, and because of this contiguous relationship the cotton usually is fed horizontally from the strippers into the elevating conveyer.

In addition, by reference to Fig. 38, it will be seen that as the cotton bolls are stripped free of a spindle, the free bolls are impelled generally toward deflectors 335 and 338 by the bolls on the next oncoming spindle and by the spindle itself, the free bolls being guided by the spreader plate and these curved deflectors to enter the pockets presented by the active course of the elevating conveyer. A partial vacuum is also formed by the upward movement of the pocket forming paddle elements of the elevating conveyer which additionally helps to draw or inspirate the stripped cotton horizontally from the discharge end of the stripping devices into these pockets for elevation to the storage basket.

As is indicated in Fig. 39, the stripping devices 326 are mounted in a vertical series on channel member 329 so that adjoining shoes have only sufficient clearance to permit passage of a spindle therebetween. The spindles with bolls of cotton wrapped therearound pass between the opposed edges of adjacent strippers, the cotton being thus stripped off and deflected and inspirated into the receiving opening in conveyer 241. Any cotton gravitating to the bottom of this opening encounters inclined floor 252 which guides the stripped cotton into the path of conveyer 241. Referring also to Figs. 28 and 38, a safety door 339 is pivotally mounted on the stripper shoe side of the inner wall of elevating conveyer 241 and is spring biased away from this inner wall and into contact with a switch element 340 carried by an upper portion of the picker unit. This switch is preferably connected in the tractor magneto circuit (not shown) and if for some reason the elevating conveyer 252 becomes jammed and the stripped cotton piles up between the stripping devices and door 339 sufficiently to cause the latter to break its contact with switch element 340, the ignition circuit will then be opened and operation of the tractor motor will cease.

Referring again to Figs. 48 and 51, it will be seen that the nose portion of each stripping shoe 331 is split vertically and that therefore the oppositely facing side edges may be readily adjusted toward or away from each other and consequently toward or away from the opposed edges of adjacent shoes simply by tightening or loosening bolts 334. Tightening bolts 334 forces spreader plate 336 deeper into the trough shaped portion of the shoe thereby spreading the sides of shoe apart whereas loosening bolts 234 permits compression springs 337 to move the spreader plate outwardly of the trough which in turn permits the sides of the shoe to move towards each other. Therefore, it should be apparent that the spacing between the opposed stripping edges presented by adjacent shoes may be readily adjusted, as desired, without altering the spacing between others of the opposed edges.

After the spindles leave the stripping device they continue around the generally oval path followed by the slats and the operations of moistening the spindle, rotating the spindle and inserting it in the cotton plant, ceasing rotation of the spindle, withdrawing the spindle, positioning the spindle for stripping and stripping the spindle, are repeated.

Figures 36, 37, 37A:
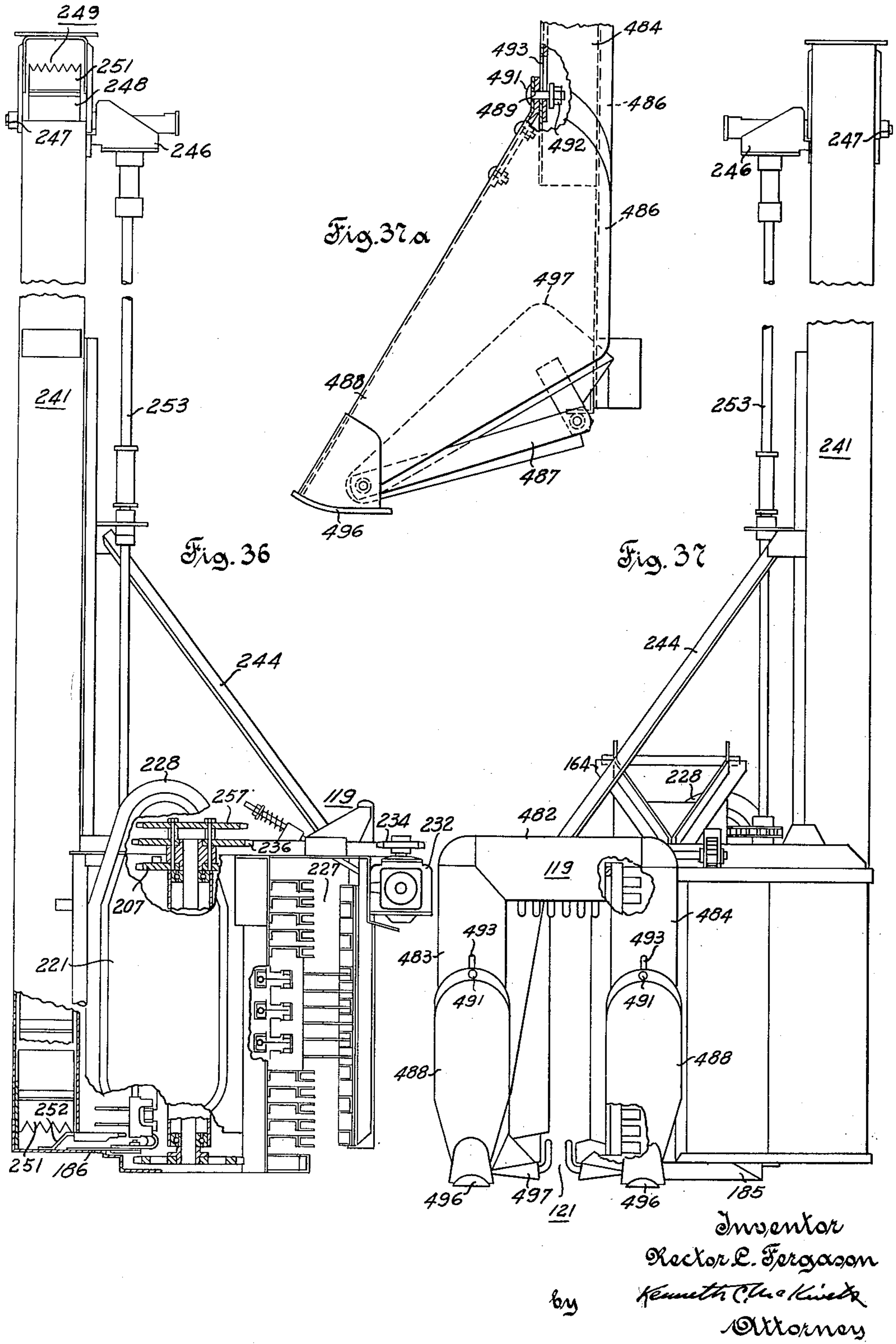
Fig. 36 is a rear elevation, with parts broken away and shown in section, of the right hand picker unit and elevator.
Fig. 37 is a front elevation of the right hand picker unit and elevator with some parts broken away and shown in section.
Fig. 37A is an enlarged side elevation of a divider point with parts broken away and shown in section.
Figures 59, 60:
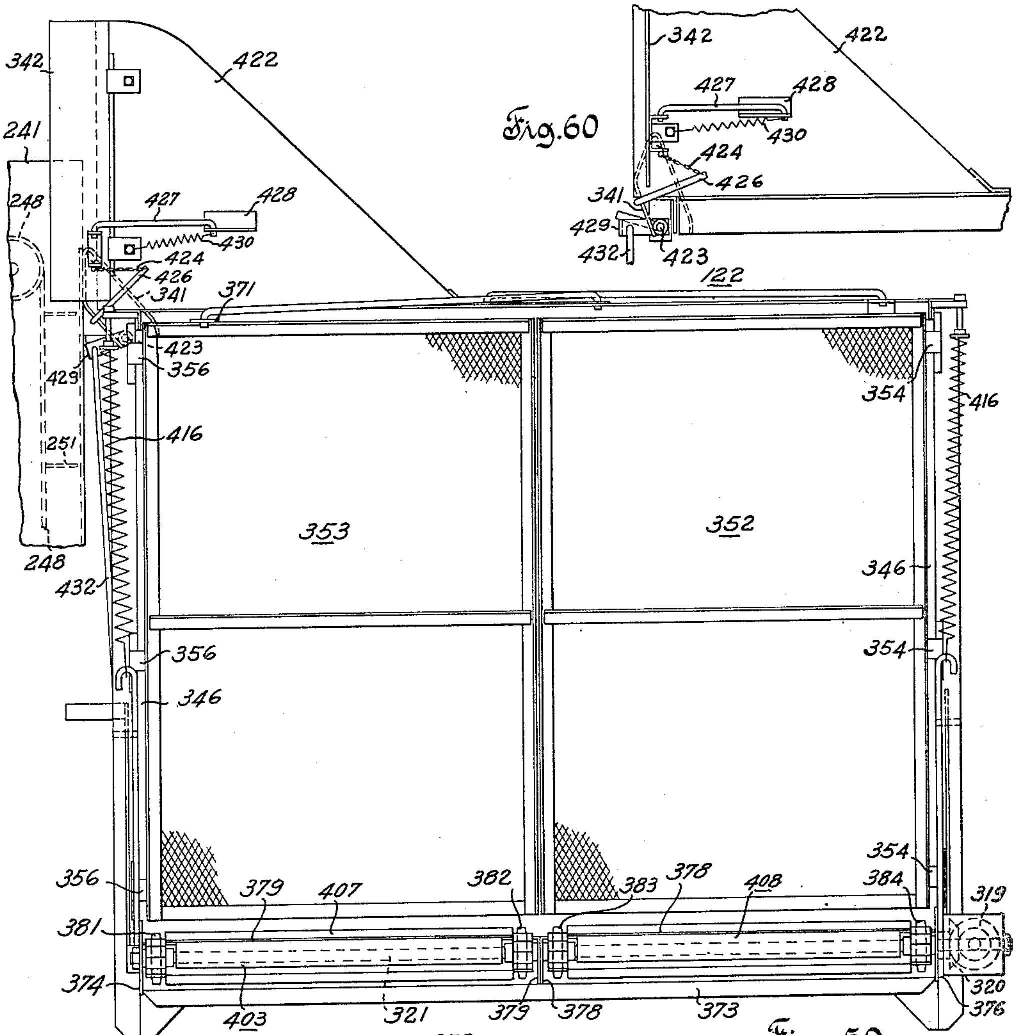
Fig. 59 is an elevation of the discharge side of the basket with the floor extension in discharge position and the hood flaps in closed position.
Fig. 60 is a view of the basket hood with the flaps shown in open position.

Referring to Figs. 36 and 59, it will be apparent that elevating conveyer 241 is carried by the picking unit. The receiving end of the conveyer is mounted adjacent curved plate 252 on bottom member 186 and extends upward therefrom alongside the stripping devices in position to receive cotton removed from the spindles by these devices. The conveyer elevates the cotton and discharges same directly into basket 122 or into the basket over a throat member 341 (Fig. 57) which is carried by the basket. The upper end of the elevating conveyer coacts with a pair of vertical flap members 342 which are positioned adjacent opposite sides of the throat member to confine and shield the cotton from adverse winds as it transverses the throat member upon leaving the conveyer.

Basket 122 comprises an open topped box like structure which is pivotally mounted on longitudinally extending frame member 124 and includes a floor member 343 (Fig. 57) provided with a hydraulic ram attaching part 344 located centrally on the bottom of said floor. Hydraulic ram 173 is pivotally mounted on pipe frame 19 and the active end of the ram is attached to part 344. Vertically extending angle irons 345 and 346 are attached to the right and left corners, respectively, of floor member 343 and are joined at their upper ends by transversely extending rear and front frame members 347 and 348, respectively, and by left and right side frame members 349 and 351, respectively. Three of the sides of basket 122 have wire mesh attached to the frame members and angle irons making up the frame structure of the basket. The fourth or left side of the basket is closed by doors 352 and 353 pivotally mounted on hinges 354 and 356, respectively, carried by angle irons 346 (Fig. 59). Plate members 357 and 358 are attached vertically to floor 343 and angle irons 345 and 346 in generally parallel relation to top members 347 and 348. An upper floor 359 is constructed of two sections 361 and 362 having bent over inner opposed edge portions disposed in abutting relation between and supportedly connected by flanges 363 and 364 carried by floor member 343, and having turned over outer edge portions (not shown) attached in side abutting relation to plates 357 and 358, respectively, thereby positioning upper floor 359 in spaced elevated relation to lower floor 343. A bell crank lever 366 (see Fig. 56) is pivotally supported on the top side of frame member 351 and has one arm pivotally connected with the forward end of a rearwardly extending rod 367 and has its other arm pivotally connected with the rear end of a forwardly extending rod 368. The rear end of rod 367 is pivotally attached to a flange 369 carried by door 352 and the front end of rod 368 is pivotally attached to a flange 371 carried by door 353. An overcenter spring mechanism 372 has one end pivotally attached to flange 369 and has its other end attached to frame member 347. When the doors are closed as indicated in Fig. 59 spring mechanism 372 acts to hold the doors in their closed position and when the doors are open as indicated by the dotted line position of the basket shown in Fig. 6 the attachment point of spring 372 to door 352 has moved the spring past the center of hinge 354 and therefore the spring acts to hold the doors in their open position.

Figures 56, 57, 58:
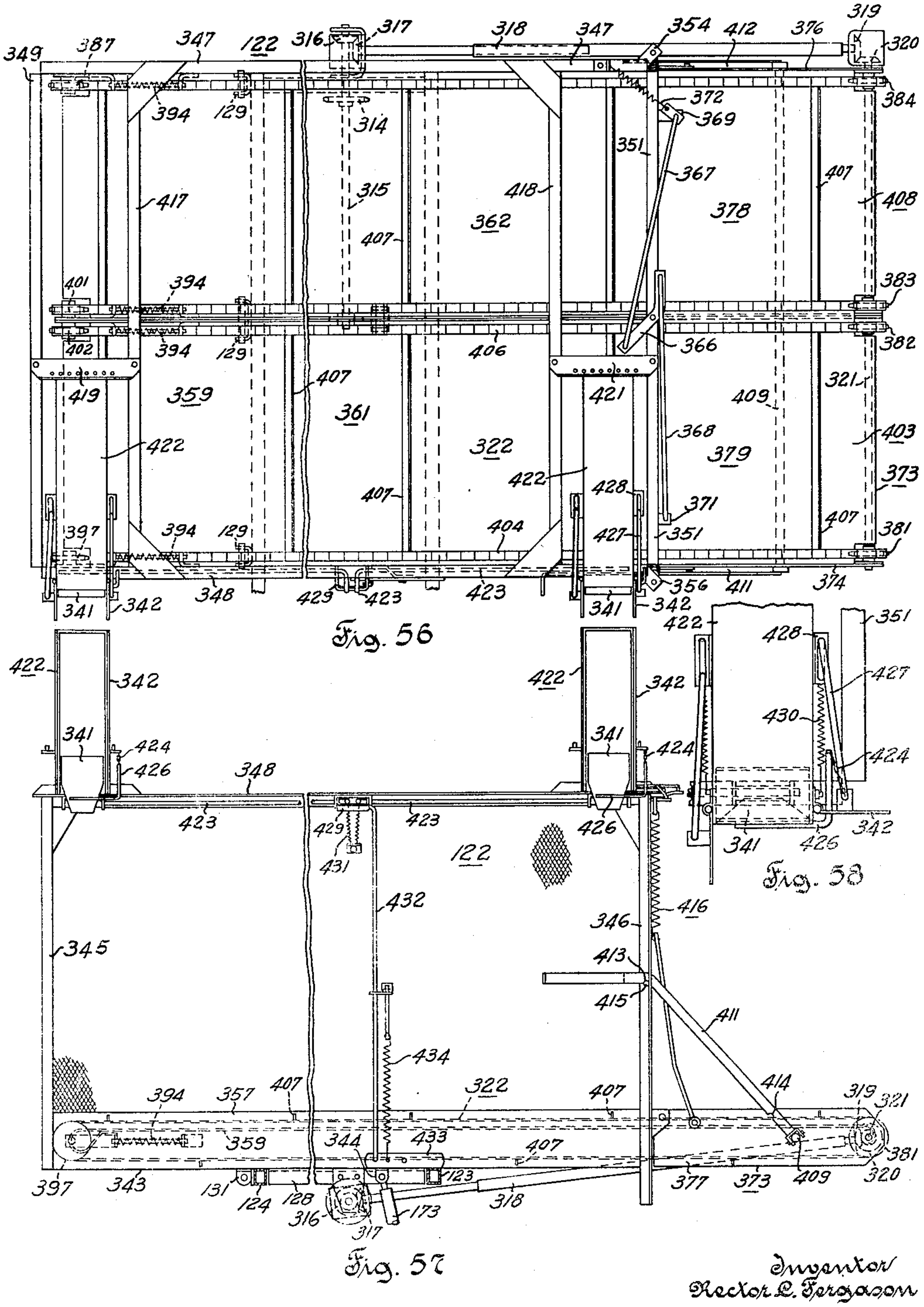
Fig. 56 is a plan view of the material confining basket with the floor extension in discharge position.
Fig. 57 is a side elevation of the basket shown in Fig. 56.
Fig. 58 is an enlarged partial plan view of the elevator hood with one hood flap in open position.

Pivotally attached to side plate members 357 and 358 is a lower floor extension 373 comprising a pair of side members 374 and 376 mounting a floor member 377, side members 374 and 376 being aligned with plate members 357 and 358, respectively, and floor member 377 being aligned with floor member 343 when the floor extension 373 is in its lowered position as shown in Fig. 56.

An upper extension floor constructed of two sections 378 and 379 (Fig. 59) having turned over inner opposed edge portions joined together in supported relation to extension floor member 373 and each having a turned over outer edge portion (not shown) attached in side abutting relation to side members 376 and 374, respectively, thereby positioning the upper extension floor in spaced elevated relation to lower floor 373 and in alignment with the upper floor of the basket when the floor extension is in its lowered or discharge position. Journaled in the free outer ends of side members 374 and 376 is shaft 321 having sprockets 381, 382, 383, and 384 attached thereto.

Figure 61:
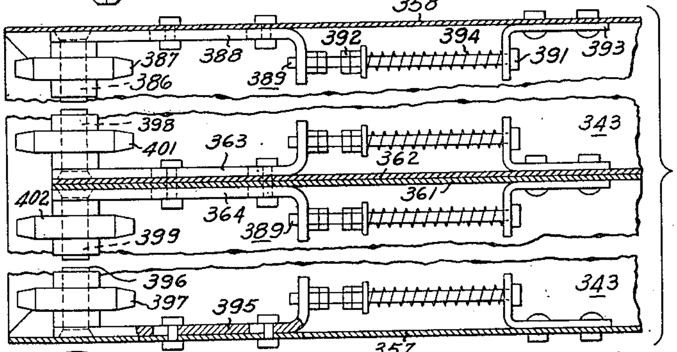
Fig. 61 is a fragmentary plan view of basket floor conveyer chain tightening and releasing means with parts removed and shown in section.
Figure 62:
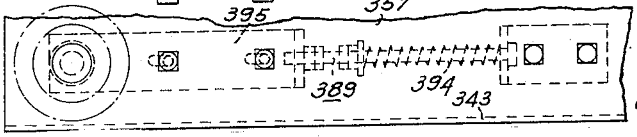
Fig. 62 is a side elevation of the apparatus shown in Fig. 61.

As indicated in Figs. 61 and 62, a stub shaft 386 rotatably supporting a sprocket wheel 387 is carried by a member 388 slidably engaged with plate member 358. The end of member 388 remote from sprocket wheel 387 is provided with an inturned portion to which is attached one end of a rod 389 having an enlarged head 391. A pair of spring tensioning nuts 392 threadably engage a mid-portion of rod 389 and a bracket 393, rigidly attached to the inner side of plate member 358, slidably encircles a portion of rod 389 between the head thereof and adjusting nuts 392. A spring 394 surrounds rod 389 in interposed relation between flange 393 and adjusting nuts 392. A stub shaft 396, rotatably supporting a sprocket 397, is similarly slidably attached to plate 357 with stub shaft 396 disposed in spaced axial alignment with respect to stub shaft 386, the attaching means including a member 395 similar to member 388. And stub shafts 398 and 399 carrying sprocket wheels 401 and 402, respectively, are similarly slidably attached to turned over portions of floor sections 361 and 362, these two stub shafts being disposed in axial alignment with respect to each other and with respect to stub shafts 386 and 396.

Floor conveyer 322 includes two similar endless conveyer sections 403 and 408, each section comprising a pair of chains 404 and 406 connected by a plurality of slats 407. The chains of section 403 pass around sprockets 397 and 402 and around sprockets 381 and 382 which drive same whereas the chains of section 408 pass around sprockets 401 and 387 and around drive sprockets 383 and 384. In this connection it will be noted that the inner edge portions of upper floor sections 361 and 362 curve downward and are slotted for the projection of sprockets 387, 397, 401 and 402 therethrough. Likewise, the outer edge portions of upper floor extension sections 378 and 379 are similarly curved and slotted for the projection of sprockets 381, 382, 383 and 384 therethrough. These endless conveyer sections are operable when floor extension 373 is in its lowered position to move outward over upper floor sections 361, 362, 378 and 379, down around the sprockets carried by conveyer shaft 321, and return under the upper floor sections and over the bottom floors, as indicated in Fig. 57. Figs. 61 and 62 show sprockets 387, 397, 401 and 402 in the positions assumed when the floor extension is in its lowered or operative position. When the floor extension is swung to its raised or closed position, brackets 363, 364, 388, and 395 move to the right as viewed in Figs. 61 and 62 additionally compressing springs 394, this movement shifting the rear ends of endless conveyer sections 403 and 408 outward sufficiently to permit floor extension 373 to be folded up against and retain basket doors 352 and 353 in closed position. Springs 394 also function as chain tighteners when the chains are in material discharge position.

Pivotally mounted in floor extension side plates 374 and 376 is a rock shaft 409 having arms 411 and 412 attached to the ends thereof for movement therewith. These arms each have two notches 413 and 414 formed therein which are adapted to engage a projection 415 carried by the associated angle iron 346 adjacent a slot therein slidably received the associated one of the arms 411 and 412, the engagement of these notches with the projections 415 renders arms 411 and 412 operative to latch the floor extension in either its folded or extended position. The end of lever 411 has an upper end portion offset in position to be manipulated by the operator for engaging or disengaging the notches with projections 415 carried by angle irons 346. A pair of counterbalancing springs 416 connect the upper portion of the basket with the floor extension and act to reduce the force required to return the floor extension to its folded, transport position.

A pair of braces 417 and 418 unite intermediate opposed portions of upper frame members 347 and 348 of the basket. And additional braces 419 and 421 connect basket frame member 349 with brace 417 and basket frame member 351 with brace 418. A pair of hood structures 422 are attached to the front top side of the basket through suitable fastening means secured to braces 419 and 421 and to opposite top side portions of upper frame member 348, the fastening means preferably utilizing some of the holes of the similar series formed in the braces and opposite portions of frame member 348 (only those in the braces being shown) so that the hood members can be selectively positioned to conform with the lateral adjustment of the picker units 119. Throat member 341, which functions as a floor to bridge the space between the discharge end of the elevating conveyer 241 and the basket 122, is carried by an end portion of a rod 423 which in turn is pivotally supported by upper basket frame member 348 in generally parallel relation thereto. Flap members 342 are secured to opposite side portions of the hood structure for pivotal movement about vertical axes and as viewed in Fig. 56, a chain 424 connects each right hand flap member to the upturned end portion of a rod 426 attached to the throat member 341. This connection is such that when the throat member is pivoted to inoperative position flap members 342 are also moved to inoperative position. Pivotally attached to each flap member is a rod 427. (Figs. 63 and 64) having its opposite end slidably received in a slotted bracket 428 carried by the hood member. A spring 430 has one end secured to the hood member and has its other end attached to the end of rod 427 associated with bracket 428, this spring acting to maintain the flap member in operative position. The other end of rod 423 is bent outward and extends over a U-shaped bracket 429 pivotally mounted on an axis coincident with rod 423. A spring 431 has one end connected to a portion of basket 122 below rod 423 and has its other end attached to the bent end of this rod thereby biasing same downwardly against the upper edge of bracket 429. Pivotally attached to bracket 429 is a vertically depending rod 432 having its lower end pivotally connected to one end of a lever 433 (see Figs. 6 and 57) pivotally mounted on a base portion of the basket. A spring 434 having one end attached to the basket and having its other end connected to lever 433 acts to bias this lever in a lockwise direction as viewed in Fig. 6. When the basket is raised, this spring functions to pivot lever 433 in a clockwise direction thereby raising rod 432 and bracket 429, the latter in turn raising the turned over ends of rods 423 thereby moving the throat member and flaps out of contact with elevating conveyer 241. When the basket is lowered, the free end of lever 433 contacts frame member 123 which causes the lever 433 to pivot against the bias of spring 434 thereby pulling rod 432 and bracket 429 downward, the latter tending to move away from the outturned ends of rods 423. However, springs 431 effect a following pivotal movement of rods 423 and a consequent movement of throat members 341 to their operative positions in contact with elevators 241, the latter serving as an additional stop for limiting the movement of these parts as effected by the downward pull of springs 431. As the throat member moves back to operative position, chain 424 tends to become slack which permits springs 430 to effect a return of the hood flaps to their operative positions vertically bridging the space between the discharge end of the elevating conveyer and basket 122. It will be noted that throat member 341 has a turned over portion 425 which coacts with a flange attached to frame member 348 to limit the movement of throat member 341 when returning to operative position as is indicated in Fig. 63.

The operation of the hood flaps and throat member as shown in Fig. 6 during the process of raising the basket is as follows. As the basket raises, spring 434 biases lever 433 in a clockwise direction. When the free end of lever 433 loses contact with frame member 123, the biased end of lever 433 moves similarly upwardly shifting rod 432 which in turn similarly pivots bracket 429. This movement of bracket 429 imparts a similar movement to the bent ends of rods 423 which in turn causes rods 423 to pivot clockwise as viewed in Fig. 59 thereby moving throat members 341 from the position shown in Fig. 59 to the position shown in Fig. 60. As this occurs, chains 424 pull flap members 342 from the position shown in Fig. 59 to the position indicated in Fig. 60.

Figures 63, 64, 65:
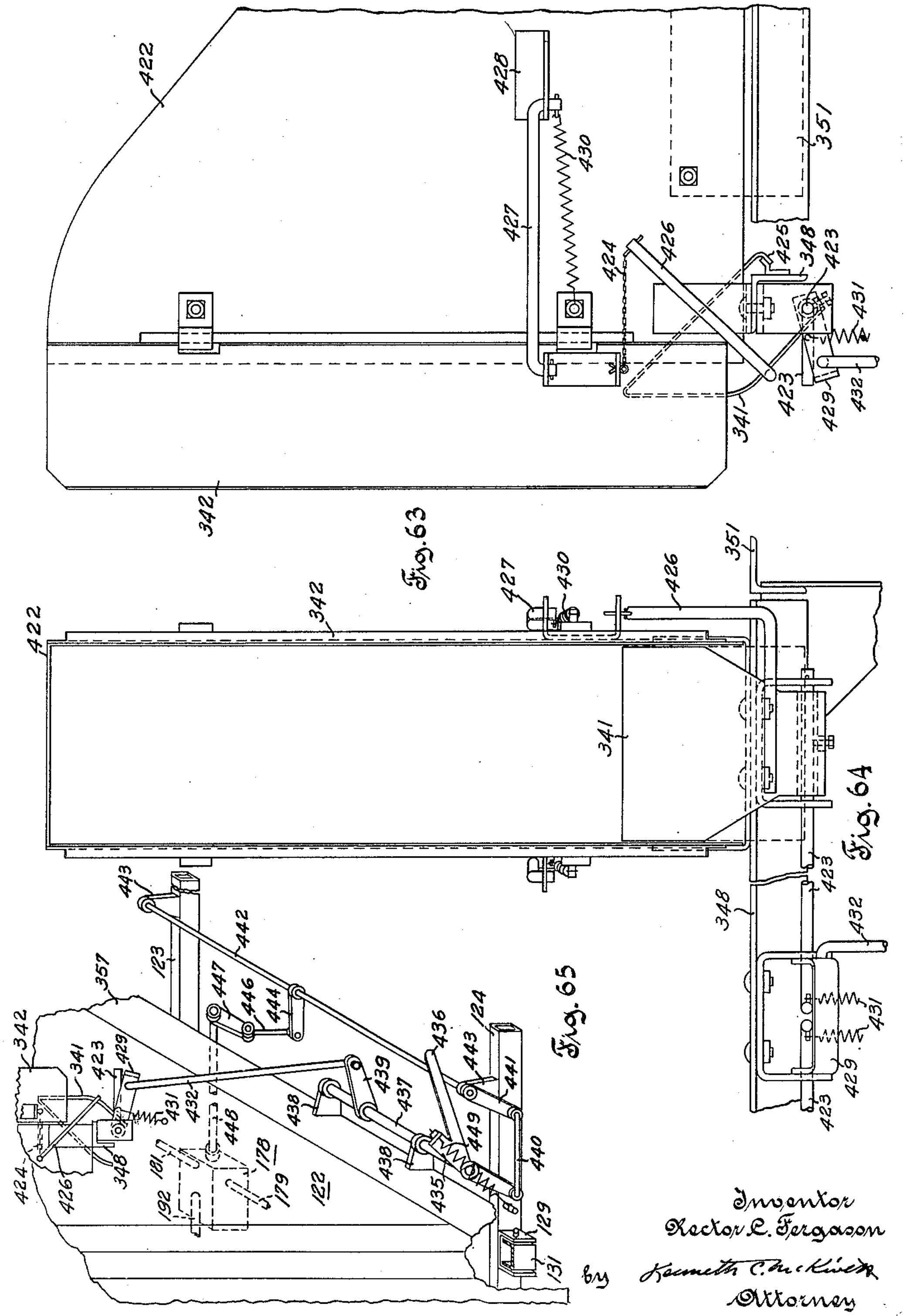
Fig. 63 shows an enlarged elevation of the discharge hood with flap in closed position.
Fig. 64 is an end view of the left side of the discharge hood shown in Fig. 63.
Fig. 65 is a perspective view of the forward side of the basket and support frame therefor, showing a modified control means for the three-way valve and the throat and flap members.
Figures 66, 67, 68, 69, 70, 71, 72:
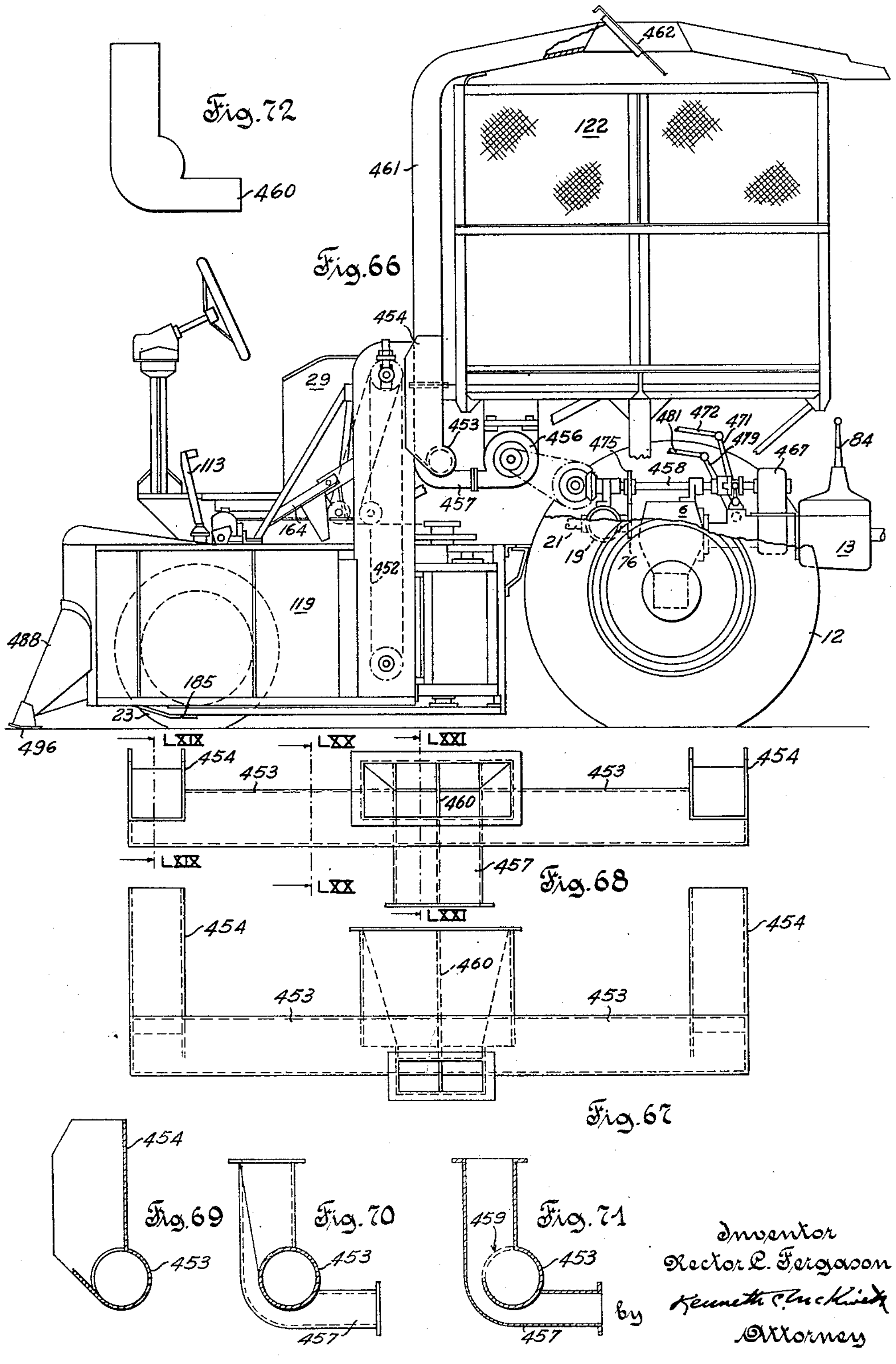
Fig. 66 is a side elevation of a cotton harvester wherein the harvested cotton is elevated into the basket by means of a jet of air produced by a blower.
Fig. 67 is a front view of the injector and associated conduits for elevating harvested cotton.
Fig. 68 is a plan view of the injector shown in Fig. 67.
Fig. 69 is a section taken along the line LXIX—LXIX of Fig. 68.
Fig. 70 is a section taken along the line LXX—LXX of Fig. 68.
Fig. 71 is a section taken along the line LXXI—LXXI of Fig. 68.
Fig. 72 shows the contour of the plate which separates the dual intake and discharge conduits.

A modified type of control means for the hood flaps is shown in diagrammatic form in Fig. 65. In this modification the hood flaps and throat member are still moved out of position by an upward movement of rod 432 but instead of effecting such movement by the action of a biasing spring a hand lever 436 is provided which also controls the position of three-way hydraulic valve 178. Lever 436 is attached to a shaft 437 which is pivotally supported in brackets 438 carried by basket side plate 357 and is provided with a crank arm 439 pivotally connected to rod 432. The lower end of hand lever 436 is pivotally attached to a link 440 which extends along the pivot axis of basket 122 and is pivotally connected to a crank arm 441 projecting from the adjacent end of a transverse rock shaft mounted in brackets 443 carried by frame members 123 and 124. Also attached to shaft 442 is a crank arm 444 having a pivotal connection with a link 446 which in turn is pivotally attached to a crank arm 447 attached to three-way valve operating rod 448. A spring 449 connects frame member 124 with a crank arm 435 forming a part of lever 436, this spring being in a dead center position relative to the axis of rock shaft 437 when lever 436 is in its mid-position. In other words, spring 449 is an overcenter spring designed to maintain lever 436 in its fully raised or lowered positions.

This modified control means for the three-way hydraulic valve, the hood flaps and the throat member provides a positive linkage for moving the flaps and throat member out of the way of possible damage as the basket is raised past the elevating conveyers and at the same time providing means for correctly positioning the three-way hydraulic valve to raise or lower the basket or to raise or lower the unit, these functions being secured by a simple movement of one lever.

Assuming the cotton harvester is operatively moving through a field of cotton, lever 436 is in its lower position as indicated in Fig. 65 and the throat and flap members are in the position indicated in Fig. 59 with the upper end of the throat member in contiguous relation to the adjacent side of the housing of conveyer 241, and the three-way valve is positioned to place hydraulic ram 154 in communication with pump 176 for controlling the position of the picking units, as desired. It is apparent that if the hydraulic pump is actuated to raise or lower the picking units, no destructive contact will take place between the discharge end of the elevating conveyers and the flaps and throat members as the resulting relative movement of these parts is merely vertical straight-line motion. However, if the basket were to be raised to its discharge position without first moving the throat members and those flap members, which face the floor extension side of the basket, to their positions shown in Fig. 60, a destructive contact would result between the upper end of the elevating conveyer and these flap and throat members as the latter members are carried by the basket and move angularly relative to the elevating conveyers 241. A raising of lever 436 shifts the flaps facing the floor extension side of the basket and both throat members to the positions indicated in Fig. 60 and shifts the three-way hydraulic control valve so that basket ram 174 is in communication with the hydraulic pump which then can be safely operated to raise or lower the basket. In this connection, it will be noted that although the remaining or offside flaps are hinge connected to their respective hood structures and spring biased to their operative forwardly extended positions in exactly the same manner as the near side flaps mentioned in the preceding sentence, these offside flaps are not connected to actuating rods 423 and consequently are not shifted to an inoperative position by the raising of the basket or by the manipulation of lever 436. Obviously there is no destructive contact between the offside flaps and the elevating conveyer housings 241 as the basket is raised as these flaps move angularly away from rather than toward such housings. And a primary purpose of providing the offside flaps with a biased hinge support is to maintain the flaps positioned in close proximity to the sides of the elevating conveyer housing and yet permit some degree of relative lateral movement therebetween. In addition, such a mounting permits the picking units to be laterally adjusted to conform with different row spacings without first detaching the hood structures from the basket. With the basket in its raised position and the floor extension lowered, rod 60 can be manipulated by the operator to establish a driving connection between sprocket 57 and power take-off shaft 52 whereupon the basket floor conveyer 322 then moves the picked cotton against the basket doors forcing them to an open position, the picked cotton then moving outwardly over the end of the basket floor extension into a suitable vehicle positioned therebelow.

Figs. 66 through 72 show an alternative construction for moving picked cotton from the picking unit to the basket and an alternative type of power take-off, the alternative cotton moving mechanism also utilizing elevating conveyer 452 supported on the picking unit. However, in this embodiment the conveying unit does not discharge directly into the basket but instead discharges into a transverse horizontally extending pipe 453 having upwardly extending cotton receiving end portions 454 carried by the basket supporting frame structure. A blower 456 is supported by the basket supporting frame in underlying relation to the basket and has its outlet pipe 457 connected to a mid-portion of pipe 453 in partially enclosing relation thereto, blower 456 being operatively connected to a power take-off shaft 458 by suitable power transmitting means. Pipe 453 has an opening 459 through a top side portion thereof enclosed by blower discharge pipe 457 so that the air stream from the blower passes around pipe 453 and creates a partial vacuum over opening 459 thereby utilizing injector action to move picked cotton, deposited into the ends of pipe 453 by conveyer 452, inward toward control opening 459 and upward therethrough into the blower air stream. The cotton is then blown through tube 461, which forms an upward continuation of blower discharge pipe 457 and extends rearward over the basket 122 to a point of discharge adjacent the opposite side thereof. An intermediate section of the portion of pipe 461 overlying basket 122 has no bottom wall and this section is provided with an inclined grill 462. The cotton passing through conduit 461 impinges on grill 462 and having thus lost its velocity drops out of the intermediate section and into the basket, while the bulk of the smaller particles of dirt and the like, which are less buoyant, pass through the grill and are discharged from conduit 461 at the rear of the basket. To permit ready raising of the basket, tube 461 is attached to basket 122 and has a horizontal flush fit with the top end of blower discharge pipe 457 so that when basket 122 is raised the lower end of tube 461 simply moves upward away from the top end of pipe 457. It will be noted that pipe 457 has a centrally located spacer plate 460 (see Fig. 72) which divides the blast of air transversely as the air enters pipe 457 thereby eliminating interference between the streams of material inspirated from the opposite ends of pipe 453.

Figure 73:
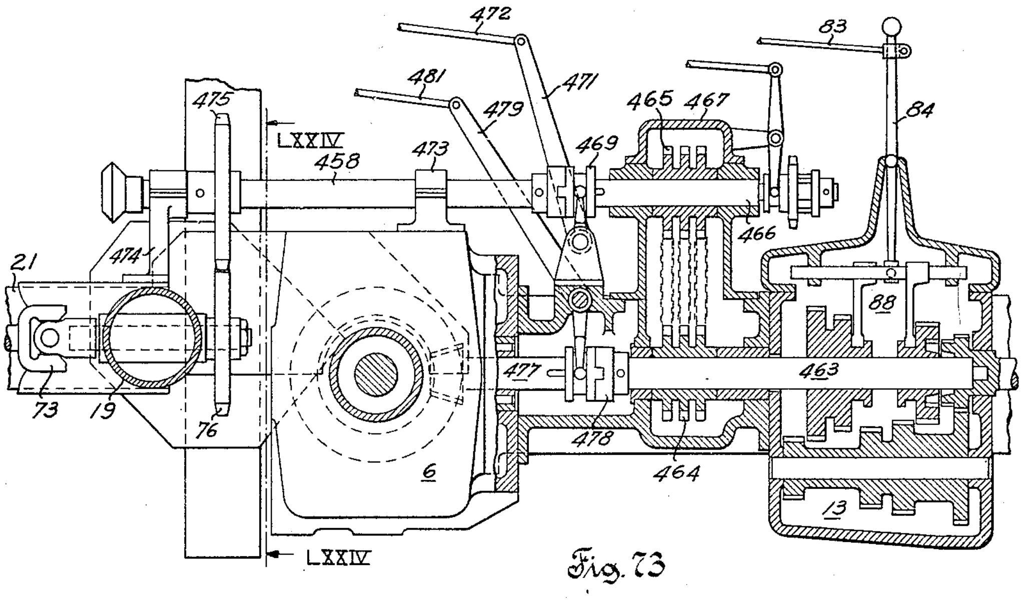
Fig. 73 shows a side elevation with some parts cut away and shown in section of a modified transmission wherein the power shaft which actuates both pickers is mounted above the tractor rear axle housing.
Figure 74:
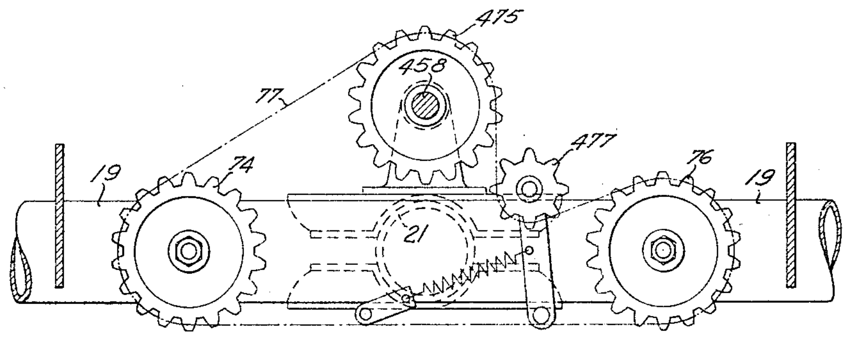
Fig. 74 is a section along the line LXXIV—LXXIV of Fig. 73.

Referring again to Fig. 66 and also to Figs. 73 and 74 it is seen that a modified type of power take-off means may be incorporated in this embodiment of the invention. As shown, the mobile vehicle includes a conventional change speed gearing 13 having a shiftable set of gears 88 splined to the usual engine driven transmission shaft 463, gears 88 being shiftable by a conventional shift rod 84 connected to an extension rod 83. Also spline connected to shaft 463 is a multiple sprocket 464 which is chain connected to a multiple sprocket 465 attached to a shaft 466 rotatably supported in a housing 467 carried on transmission housing 46. Shaft 466 is connected to power take-off shaft 458 by means of a clutch 469 operable by a shifting lever 471 connected to an extension lever 472 terminating (not shown) adjacent the operator's station 29. Power take-off shaft 458 is journaled in a bracket 473 carried on rear axle housing 6 and in a bracket 474 carried on transverse frame member 19. A sprocket 475, attached to shaft 458 for rotation therewith, is drivingly connected to sprockets 74 and 76 by means of chain 77 which is suitably tightened by a spring biased idler sprocket 477 carried by transverse frame member 19. Transmission shaft 463 is connected to differential drive shaft 477 by means of a clutch 478 operable by a lever 479 connected to an extension link 481 terminating (not shown) adjacent the operator's station.

From the foregoing description, it is seen that a power take-off device has been provided wherein the power take-off speed is directly proportional to the ground speed and wherein the power take-off may be operated independently of the forward movement of the tractor and the tractor may be driven without operating the power take-off.

As has previously been indicated, the picking units 119 are adjustable transversely to coincide with correct spacing of the plant rows and the hoods 422 including the throat members 341 on the basket 122 are also adjustable to be lined up with the discharge end of the elevating conveyer 241. As the harvesting machine moves through the field the picking unit throat assemblies 121 guide adjacent rows of cotton plants into the picking tunnel 227. The picking spindles 217 pass between adjacent moistening pads 276 and following the track of the picking slats 212 move into the picking tunnel. As the spindles enter the picking tunnel the enlarged knurled portions 259 thereof contact the stationary spindle driving track 272 and as the spindle is carried along this track, the frictional engagement causes the spindle to rotate. This rotation, coupled with the nature of the flutes and the fact that the fluted surface is moistened, causes ripe cotton to adhere to the spindles and to be wrapped therearound as the spindles pass through the plants. After the spindles are withdrawn from the cotton plant in following the slat track, the spindles then lose contact with the drive track, cease rotation and are withdrawn from the picking tunnel. The slats are then decelerated and positioned for stripping by the hold back disc 323 and the slat positioning device 324 which sets the spindles at a proper angle for entering the stripping device. The spindles enter between opposed edges of adjacent stripping shoes 326 and are drawn therebetween stripping the cotton from the spindles. The cotton moves horizontally directly into the pockets formed by flights 251 of endless conveyer 241 or drops on the inclined floor 252 leading downwardly to the lower portion of the receiving end of the elevating conveyer 241 while the picking spindles return to the moistening pads to repeat the cycle. The cotton is conveyed by the elevating conveyer to the top of the basket and discharged into the basket through the hood structure, same of the cotton moving over the downwardly sloping upper surface of throat member 341 which serves as a guide for the cotton passing thereover. When the basket is filled, forward movement of the harvester and operation of the picking units, are both stopped. The three-way hydraulic valve 178 is operated to connect basket ram 173 with hydraulic pump 176, the pump being then actuated to raise the basket to its discharge position. As the basket raises the near side hood flaps and throat members are biased by spring 434 out of contact with the discharge end of the elevating conveyer, thereby avoiding destructive contact therebetween. The floor extension 373 on the basket is let down and a suitable vehicle (not shown) is spotted in underlying receiving relation to the end of the floor extension. The basket floor conveying mechanisms 403 and 408 are then actuated by the operator manipulating rod 60 which causes the conveying mechanism to move the cotton toward the basket doors 352 and 353. This results in the doors being pushed open and the doors remain open due to the bias of spring 372. When the basket is emptied, floor conveyers are stopped, the operator of the receiving vehicle closes the basket doors and aids the picker operator in returning the floor extension to its upright position retaining the basket doors in their closed position. The hydraulic pump is then actuated to lower the basket and upon reaching its normal picked cotton receiving position, the hood flaps and throat members are repositioned about the discharge end of the elevating conveyer in picked cotton receiving relation thereto by lever 433 contacting frame member 123. The three-way hydraulic control rod is then moved to picking unit position and the hydraulic pump may then be actuated to raise, lower or maintain the picking units in adjusted position. The harvester is now ready to pick another basket of cotton.

Referring to Fig. 6 which shows the position of the basket 122 in solid lines during picking operations and also shows the position of the basket in broken lines when unloading the picked cotton, it should be apparent that the center of gravity of the basket and contents thereof is relatively low down at all times and never shifts laterally very far from a vertical projection of the longitudinal axis of the harvester, thereby resulting in a stable and well balanced basket both during picking operations and during basket discharge operation.

As is indicated in Figs. 37 and 37*a*, the members forming the front throat 121 carried by the forward end of the picking unit include a transverse cotton stalk bending member 482 having depending side portions 483 and 484. Attached to each side portion is an angle member 486 pivotally mounting a link 487 which is pivotally attached at its forward end to a stalk divider point 488 which has an aperture 489 at its upper end receiving a bolt 491 to which is attached a nut 492. The lower ends of depending portions 484 each have a vertically extending slot 493 which also receives bolt 491 to form a vertically slidable connection between the upper end of divider front 488 and depending portion 484. Attached to the lower ends of guiding points 488 are upwardly curved ground contacting members 496. During picking operations the picking units normally ride on slide or shoe member 185 which is in contact with the ground and with ground contacting member 496 also riding on the ground. As the ground surface varies members 496 and points 488 follow the contour of the ground lifting down stalks and guiding them into the throat 121, aided by side shields 497 which are attached to guiding points 488 to pivot therewith.

Some of the characterizing features of the present invention are applicable to the construction and operation of apparatus different from that disclosed herein for purposes of illustration, and therefore it is to be understood that it is not desired to limit the invention to the particular features and details described hereinabove and that the invention is to be considered as including such other forms and modifications as are fairly embraced within the scope of the appended claims.

It is claimed and desired to secure by Letters Patent:

1. In a self-propelled cotton harvester of the type wherein a pair of transversely spaced picking units and a picked cotton receptacle are mounted on the motor vehicle for propulsion by the latter, the combination of an axle structure and a pair of axially spaced propelling wheels mounted thereon so as to form a rear support of said vehicle of sufficient height and width for straddling two relatively adjacent rows of cotton plants, a frame structure rigidly connected with and extending forwardly from said axle structure, a wheeled dirigible front support for said vehicle operatively connected with said frame structure in forwardly spaced relation to said axle structure, driving means for said propelling wheels and picking units including an engine, a cantilever support mounting said engine on and in rearwardly overhanging relation to said axle structure, load transmitting means mounted on said frame structure and connected with said picking units so as to position the latter at opposite sides, respectively, of said vehicle in operative relation to said plant rows forwardly of said axle structure, a structure affording said picked cotton receptacle mounted on said vehicle in overlying and substantially balanced relation to said axle structure, and an operator's station mounted on said frame structure intermediate said picking units in forwardly spaced relation to said axle structure.

2. In a self-propelled cotton harvester, the combination recited in claim 1 wherein ground engaging wheel means of said dirigible front support are positioned substantially midway between the planes of said propelling wheels and are adapted for travel in the space between said plant rows.

3. In a self-propelled cotton harvester, the combination recited in claim 1, wherein said load transmitting means comprise two vertically adjustable suspension mechanisms, one for each of said picking units, and wherein each of said suspension mechanisms comprises a balancing spring anchored at one end on said cantilever support, and a variable length lever mounted on said frame structure and operatively connected with the other end of said balancing spring so that said lever is of greatest effective length in exerting an upward force on its associated picking unit when the potential energy in said spring is the least, thereby providing a substantially uniform counterbalancing of said picking units regardless of their vertically adjusted positions.

4. A self-propelled supporting vehicle for a pair of harvesting units and a harvested material receptacle, said vehicle comprising a wheeled axle structure adapted to span two rows of relatively adjacent plant rows, a frame structure rigidly connected with said axle structure and presenting a narrow elongated member extending centrally of said vehicle in the longitudinal direction of the latter at the forward side of said axle structure, a wheeled dirigible support connected with said elongated member in forwardly spaced relation to said axle structure, a driving engine, a cantilever support mounting said engine on and in rearwardly overhanging relation to said axle structure, means including a cross member rigidly secured to and extending horizontally in opposite directions from said frame member forwardly of said axle structure for mounting said harvesting units in operative relation to said plant rows at opposite sides, respectively, of said elongated member, a superstructure mounted in elevated, forwardly and rearwardly extending relation to said axle structure and adapted to support said harvested material receiving receptacle in substantially balanced relation to said axle structure, and an operator's station mounted on a forward portion of said elongated member.

5. A self-propelled supporting vehicle for a pair of harvesting units and a harvested material receiving receptacle, said vehicle comprising a wheeled axle structure adapted to span two rows of relatively adjacent plant rows, a T-shaped frame structure rigidly connected with said axle structure and comprising a horizontally extending transverse member positioned adjacent to said axle structure and a longitudinal member extending forwardly from said transverse member substantially midway between the planes of said propelling wheels, a wheeled dirigible front support for said vehicle operatively connected with the forward end of said longitudinal member, an auxiliary cross member rigidly secured to and extending horizontally in opposite directions from said longitudinal member at a predetermined forward spacing from said transverse member and at a predetermined rearward spacing from said front support, said transverse and cross members affording rear and front supports, respectively, for mounting said harvesting units forwardly of said axle structure in operative relation to said plant rows at opposite sides, respectively, of said longitudinal member, driving means for said vehicle including an engine, a cantilever support mounting said engine on and in rearwardly overhanging relation to said axle structure, a supporting structure for said receptacle connected with said T-shaped structure in elevated, forwardly and rearwardly projecting relation to said axle structure, and an operators' station mounted on said longitudinal frame member forwardly of said auxiliary cross member.

RECTOR C. FERGASON.

References Cited in the file of this patent

UNITED STATES PATENTS

| Number | Name | Date |
|---|---|---|
| 1,109,429 | Lemmon | Sept. 1, 1914 |
| 1,149,458 | Matlock | Aug. 10, 1915 |
| 1,961,307 | Stauffer | June 5, 1934 |
| 2,013,582 | Preisser | Sept. 3, 1935 |
| 2,023,491 | Rust et al. | Dec. 10, 1935 |
| 2,024,690 | Harris | Dec. 17, 1935 |
| 2,058,514 | Rust et al. | Oct. 27, 1936 |
| 2,083,457 | Ledwinka | June 8, 1937 |
| 2,200,303 | Rust | May 14, 1940 |
| 2,234,599 | Johnston | Mar. 11, 1941 |
| 2,272,564 | Kuever, Jr. | Feb. 10, 1942 |
| 2,336,002 | Everett | Dec. 7, 1943 |
| 2,352,291 | Scarratte et al. | June 27, 1944 |
| 2,378,615 | Brown | June 19, 1945 |
| 2,413,873 | Hume | Jan. 7, 1947 |
| 2,440,767 | Baker | May 4, 1948 |
| 2,495,907 | Reinking | Jan. 31, 1950 |
| 2,520,835 | England | Aug. 29, 1950 |
| 2,523,832 | Kunkel | Sept. 26, 1950 |